(12) United States Patent
Langenberg

(10) Patent No.: US 10,030,426 B2
(45) Date of Patent: Jul. 24, 2018

(54) INDUCTIVE DOOR POSITION SENSOR

(71) Applicant: Schlage Lock Company LLC, Indianapolis, IN (US)

(72) Inventor: Daniel Langenberg, Zionsville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 9 days.

(21) Appl. No.: 15/082,648

(22) Filed: Mar. 28, 2016

(65) Prior Publication Data

US 2017/0275938 A1  Sep. 28, 2017

(51) Int. Cl.
| | |
|---|---|
| *E05F 3/10* | (2006.01) |
| *E05F 15/619* | (2015.01) |
| *E05F 15/63* | (2015.01) |
| *E05F 15/70* | (2015.01) |

(Continued)

(52) U.S. Cl.
CPC ............. *E05F 3/102* (2013.01); *E05D 15/00* (2013.01); *E05F 3/10* (2013.01); *E05F 3/224* (2013.01); *E05F 15/619* (2015.01); *E05F 15/63* (2015.01); *E05F 15/70* (2015.01); *E05Y 2201/718* (2013.01); *E05Y 2400/32* (2013.01); *E05Y 2800/122* (2013.01); *E05Y 2900/132* (2013.01)

(58) Field of Classification Search
CPC .................................. E05F 11/18; E05F 11/20
See application file for complete search history.

(56) References Cited

U.S. PATENT DOCUMENTS

| | | | |
|---|---|---|---|
| 4,085,394 A | | 4/1978 | Weisenburger |
| 4,429,264 A | * | 1/1984 | Richmond .............. E05F 15/63 318/266 |
| 4,631,478 A | | 12/1986 | Knetsch et al. |

(Continued)

FOREIGN PATENT DOCUMENTS

WO  2013048998 A1  4/2013

OTHER PUBLICATIONS

Texas Instruments; LDC1000 Inductance-to-Digital Converter; Product Catalog; Sep. 2015; 36 pages; SNOSCX2C; Copyright 2015, Texas Instruments Incorporated.

(Continued)

*Primary Examiner* — Katherine W Mitchell
*Assistant Examiner* — Catherine A Kelly
(74) *Attorney, Agent, or Firm* — Taft Stettinius & Hollister LLP

(57) ABSTRACT

One embodiment relates to a door operator including an operator body including a rotatable pinion, an arm connected to the pinion, an inductive sensor mounted adjacent the arm, and a controller in communication with the inductive sensor. The inductive sensor includes an inductor comprising a plurality of nested coils, and each of the coils is curved about the pinion. The controller is configured to provide the inductive sensor with a varying power signal, and the inductive sensor is configured to inductively link the inductor to the arm in response to the varying power signal. The inductive sensor has a characteristic which varies in response to the rotational position of the arm when the inductor is inductively linked with the arm. The controller is further configured receive information relating to the characteristic, and to determine the rotational position of the arm based upon the received information.

24 Claims, 22 Drawing Sheets

(51) Int. Cl.
*E05F 3/22* (2006.01)
*E05D 15/00* (2006.01)

(56) References Cited

U.S. PATENT DOCUMENTS

| | | | | |
|---|---|---|---|---|
| 4,845,429 | A * | 7/1989 | Burreson | H03K 17/9537 |
| | | | | 324/207.19 |
| 5,233,293 | A | 8/1993 | Huang et al. | |
| 5,367,256 | A | 11/1994 | Cooper et al. | |
| 5,410,488 | A * | 4/1995 | Andersen | G01B 7/023 |
| | | | | 324/202 |
| 5,438,261 | A | 8/1995 | Codina et al. | |
| 5,619,188 | A * | 4/1997 | Ehlers | G08B 13/08 |
| | | | | 200/61.62 |
| 6,108,975 | A | 8/2000 | Bailey | |
| 6,714,004 | B2 * | 3/2004 | Jagiella | F15B 15/2846 |
| | | | | 324/207.16 |
| 7,161,348 | B2 * | 1/2007 | Luber | G01D 5/2006 |
| | | | | 324/207.15 |
| 7,463,987 | B2 * | 12/2008 | Cech | B60R 21/0136 |
| | | | | 280/734 |
| 7,852,066 | B2 | 12/2010 | Krammer | |
| 7,971,316 | B2 | 7/2011 | Copeland, II et al. | |
| 8,390,219 | B2 * | 3/2013 | Houser | E05F 15/70 |
| | | | | 318/255 |
| 8,499,495 | B2 | 8/2013 | Houser et al. | |
| 8,527,101 | B2 * | 9/2013 | Burris | E05F 3/102 |
| | | | | 16/71 |
| 8,564,235 | B2 | 10/2013 | Burris et al. | |
| 8,600,567 | B2 | 12/2013 | Copeland, II et al. | |
| 8,653,982 | B2 * | 2/2014 | Yulkowski | E05F 15/40 |
| | | | | 340/540 |
| 8,692,497 | B2 * | 4/2014 | Vogel | E05D 15/262 |
| | | | | 312/305 |
| 8,779,713 | B2 | 7/2014 | Burris et al. | |
| 8,839,557 | B2 * | 9/2014 | Sheldon | E05F 15/2092 |
| | | | | 49/199 |
| 8,844,200 | B2 * | 9/2014 | Yulkowski | E05F 15/20 |
| | | | | 49/138 |
| 9,248,993 | B2 * | 2/2016 | Studer | B66B 5/005 |
| 9,260,036 | B2 * | 2/2016 | Walters | H02P 6/16 |
| 2006/0242908 | A1 * | 11/2006 | McKinney | E05F 15/77 |
| | | | | 49/280 |
| 2008/0018424 | A1 | 1/2008 | Takahata | |
| 2010/0115853 | A1 * | 5/2010 | Gebhart | H02P 6/085 |
| | | | | 49/506 |
| 2013/0187742 | A1 | 7/2013 | Porter et al. | |
| 2014/0304942 | A1 | 10/2014 | Li et al. | |
| 2016/0221793 | A1 * | 8/2016 | De Coi | B66B 13/22 |

OTHER PUBLICATIONS

Chris Oberhauser; Texas Instruments LDC Sensor Design Application Report; Product Catalog; Mar. 2015; 24 pages; SNOA930; Copyright 2015, Texas Instruments Incorporated.

Texas Instruments; A Revolution in Sensing World's First Inductance-to-Digital Converter; Brochure: 2013; 7 pages; Copyright 2013, Texas Instruments Incorporated.

International Search Report; International Searching Authority; International Patent Application No. PCT/US2017/024274; dated Apr. 28, 2017; 5 pages.

International Written Opinion; International Searching Authority; International Patent Application No. PCT/US2017/024274; dated Apr. 28, 2017; 8 pages.

* cited by examiner

INDUCTIVE DOOR POSITION SENSOR

TECHNICAL FIELD

The present disclosure generally relates to door position sensors, and more particularly but not exclusively relates to door operators including an inductive sensor operable to sense the position of the door.

BACKGROUND

Door operators occasionally include a sensor which detects the angular position of a door during opening and closing events. Conventional door operators of this type often sense door position through the use of a potentiometer or a relative optical encoder, each of which may have certain limitations. For example, potentiometers typically have a relatively short life span due to the fact that the mechanical interface between the wiper and the resistive material causes the elements to wear. Additionally, many optical encoders require a constant power supply, and a power loss will cause the controller to reset an internal counter used to determine the position of the door. As a result, such systems may require recalibration after a power failure event. Therefore, a need remains for further improvements in this technological field.

SUMMARY

One embodiment relates to a door operator including an operator body including a rotatable pinion, an arm connected to the pinion, an inductive sensor mounted adjacent the arm, and a controller in communication with the inductive sensor. The inductive sensor includes an inductor comprising a plurality of nested coils, and each of the coils is curved about the pinion. The controller is configured to provide the inductive sensor with a varying power signal, and the inductive sensor is configured to inductively link the inductor to the arm in response to the varying power signal. The inductive sensor has a characteristic which varies in response to the rotational position of the arm when the inductor is inductively linked with the arm. The controller is further configured receive information relating to the characteristic, and to determine the rotational position of the arm based upon the received information. Further embodiments, forms, features, and aspects of the present application shall become apparent from the description and figures provided herewith.

DETAILED DESCRIPTION OF ILLUSTRATIVE EMBODIMENTS

Figure 1:
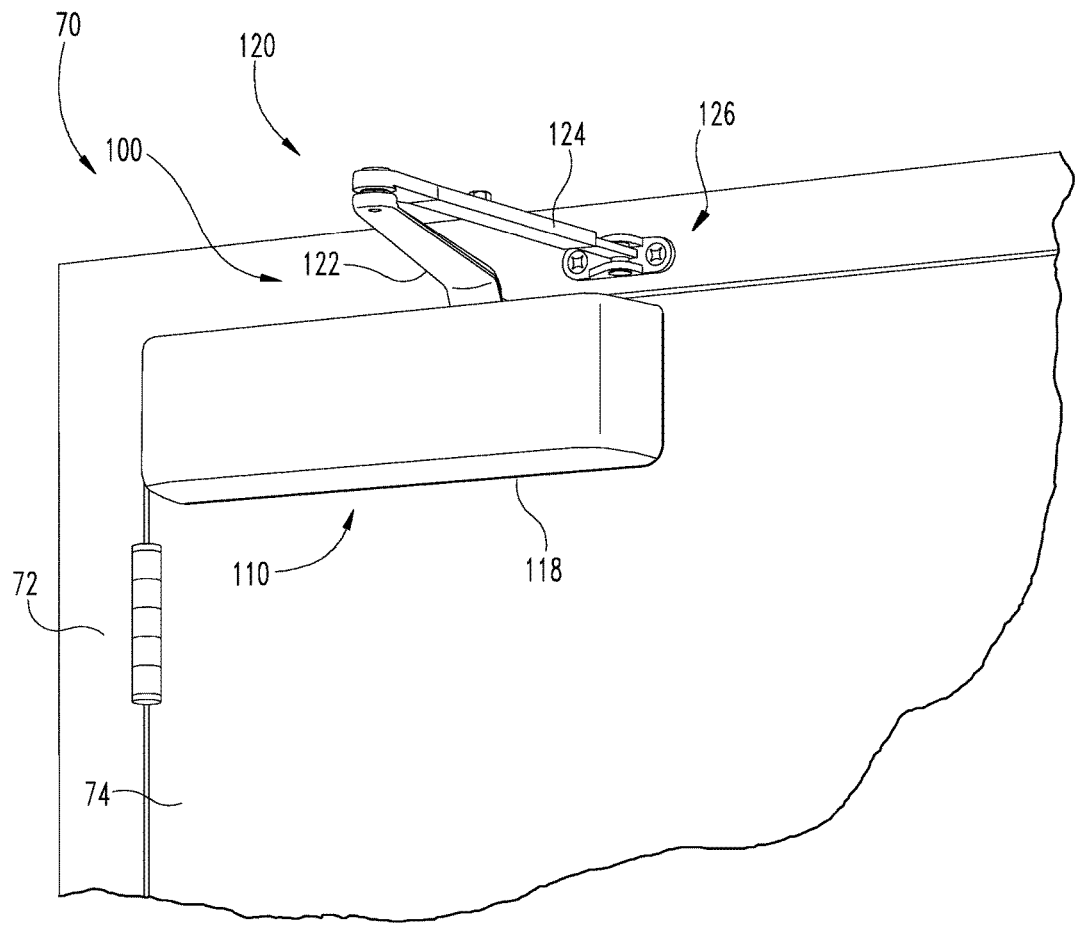
FIG. 1 is a perspective illustration of a door operator according to one embodiment installed on a closure assembly.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
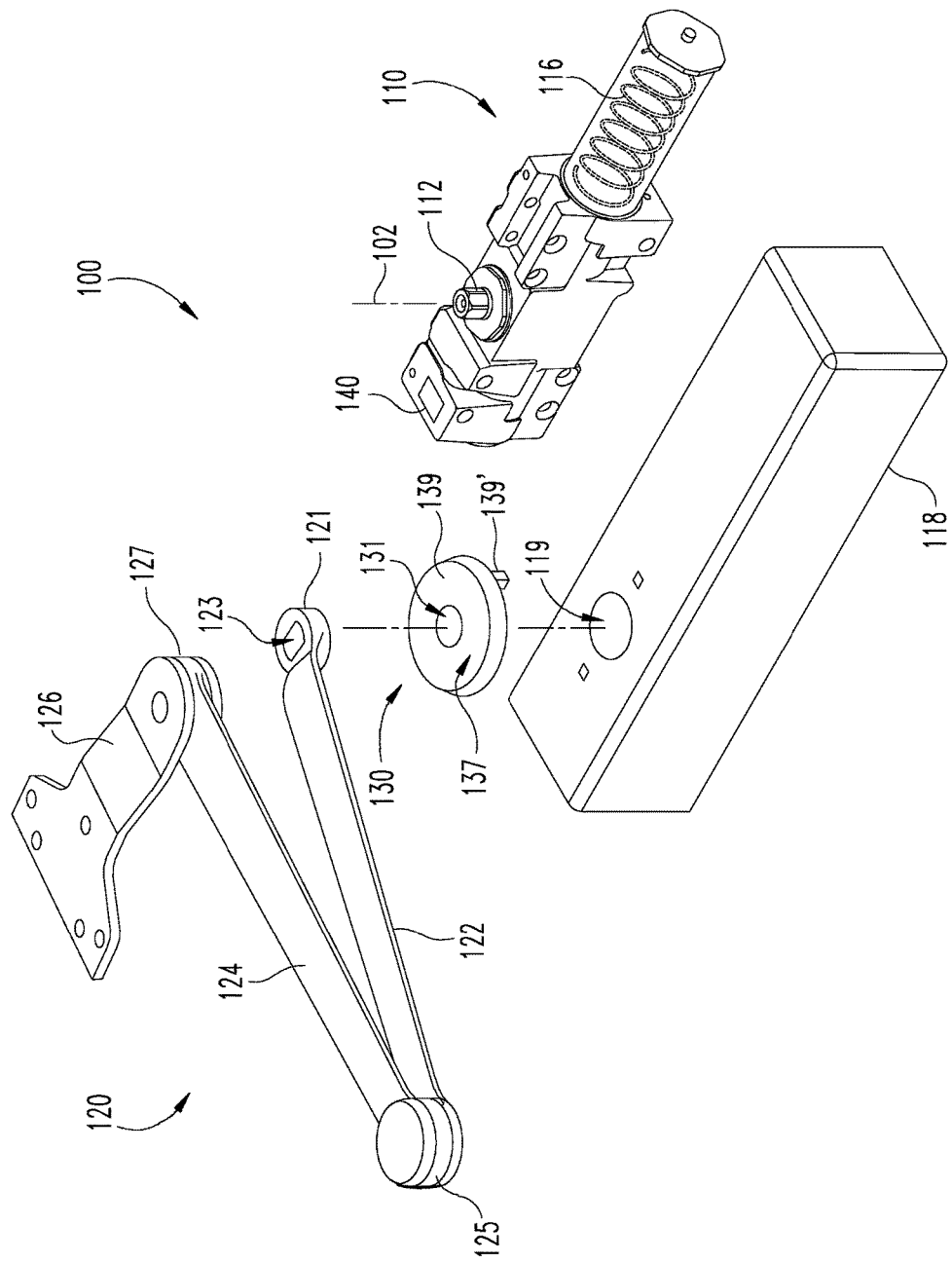
FIG. 2 is an exploded assembly view of the door operator shown in FIG. 1.

With reference to FIGS. 1 and 2, a door operator 100 according to one embodiment is configured for use with a closure assembly 70 including a frame 72, a door 74 pivotally mounted in the frame 72, and a latchbolt 76 (FIG. 4) mounted in the door 74. The exemplary door operator 100 includes an operator body 110, an arm assembly 120 connected between the body 110 and the closure assembly 70, and an inductive sensor 130 mounted on the body 110. The door operator 100 may further include a controller 140 in communication with the sensor 130. In the illustrated form, the body 110 is mounted on the door 74, and the arm assembly 120 is connected between the body 110 and the door frame 72. In other embodiments, the body 110 may be mounted on the frame 72, and the arm assembly 120 may be connected between the body 110 and the door 74.

The body 110 houses various internal components of the operator 100, including a pinion 112 which is rotatable about a rotational axis 102. The body 110 may also include a case 118 including an opening 119 operable to receive an end of the pinion 112. As described in further detail below, the body 110 may further include a rack drivingly engaged with the pinion 112, a spring 116 engaged with the rack, and an actuation mechanism 150 in communication with the controller 140.

The illustrated arm assembly 120 generally includes a first arm 122, a second arm 124, and a bracket 126. A first end of the first arm 122 includes a hub 121 which is rotationally coupled to the pinion 112, and a second end of the first arm 122 is pivotally connected to the second arm 124. For example, the end of the pinion 112 may have a non-circular cross-section, and the hub 121 may have an opening 123 configured to matingly receive the end of the pinion 112. The second arm 124 is pivotally connected to the first arm 122 by a first pivot joint 125, and is pivotally connected to the bracket 126 by a second pivot joint 127. While the illustrated arm assembly 120 is configured as a scissors-type arm assembly, it is also contemplated that the arm assembly 120 may include a single arm. For example, the second end of the first arm 122 may slidingly received in a track mounted on the door 74 or the door frame 72.

In the illustrated form, the inductive sensor 130 is mounted on the body 110 and is associated with the arm assembly 120. More specifically, the sensor 130 is positioned between the first arm 122 and the casing 118 such that the first arm 122 overlaps the sensor 130. The illustrated sensor 130 includes an opening 131 sized and configured to receive the hub 121 and/or the end of the pinion 112. The sensor opening 131 is aligned with the case opening 119, and the pinion 112 and/or the first arm 122 extends through the openings 119, 131. As described in further detail below, the illustrated inductive sensor 130 is operable to sense a rotational position of the first arm 122. While the sensor 130 in the instant embodiment is associated with the arm assembly 120, it is also contemplated that the sensor 130 may be associated with another element of the operator 100. Further details regarding one such embodiment are described below with reference to FIGS. 13 and 14.

Figure 3:
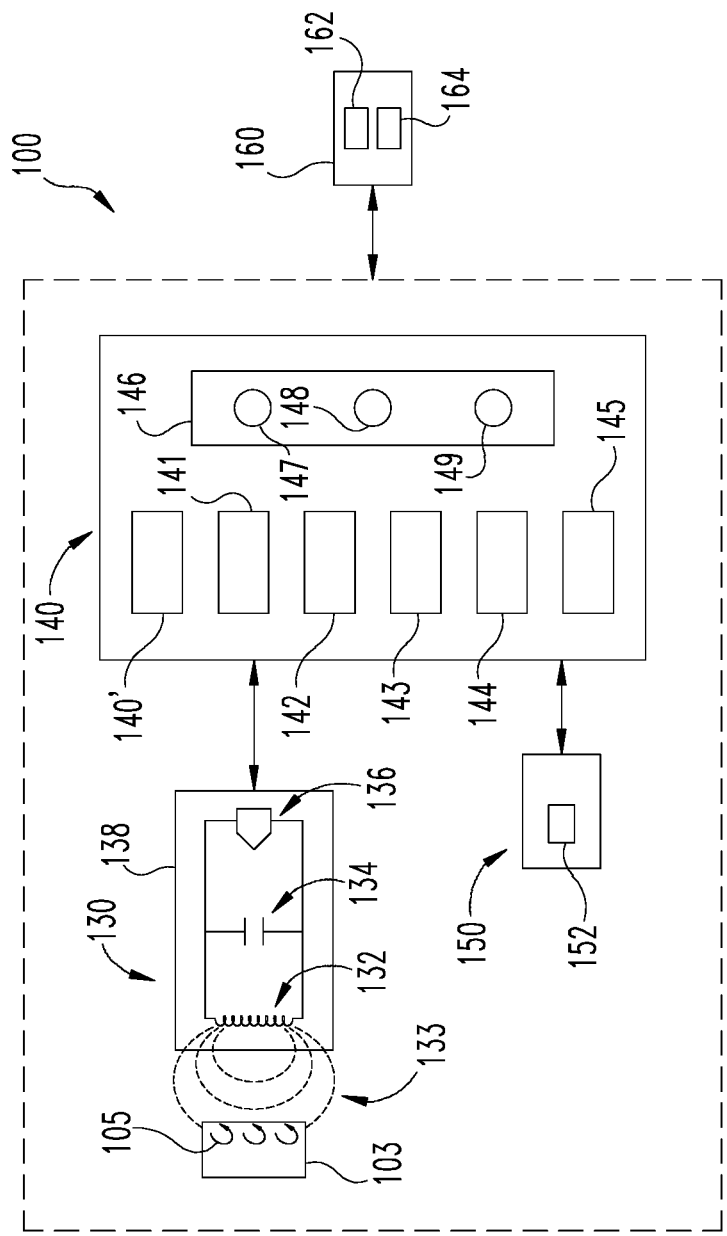
FIG. 3 is a schematic block diagram of selected components of the door operator illustrated in FIG. 1.

With additional reference to FIG. 3, the inductive sensor 130 generally includes an inductor 132 or inductive coil, and may further include a capacitor 134 connected in parallel with the inductor 132. The sensor 130 is associated with a conductive target 103 that has a position that correlates to the position of the door 74, such as the arm 122 or another element of the operator 100. As would be appreciated by those having skill in the art, an alternating current flowing through the inductor 132 will cause the inductor 132 to generate a magnetic field 133 by which the target 103 can be inductively linked to the inductor 132.

When the inductor 132 is linked with the target 103, the magnetic field 133 induces eddy currents 105 on the surface of the target 103. The eddy currents 105 are a function of the distance, size and composition of the target 103. The eddy currents 105 generate their own magnetic field which opposes the original magnetic field 133 generated by the inductor coil 132. The resistance and inductance on the secondary side of the coupling (corresponding to the target 103) shows up as a resistive and inductive component on the primary side of the coupling (corresponding to the inductor 132). Thus, changes in the distance, position and/or orientation of the target 103 with respect to inductive coil 132 will cause a variation in the eddy currents 105. Variation in the eddy currents 105 causes a corresponding variation in certain variable characteristics of the sensor 130 such as, for example, the inductance and impedance of the inductor 132. The changes in these characteristics depend on a number of factors including, for example, the specific configuration of the coils of the inductor 132. The sensor 130 is configured to generate an output signal corresponding to one or more of the variable characteristics affected by the eddy currents 105. Accordingly, the sensor 130 may be referred to as an eddy current sensor.

The sensor 130 may also include a converter 136 configured to output a signal indicative of one or more of the variable characteristics of the sensor 130. For example, the output signal may be indicative of the impedance or inductance of the sensor 130. In certain forms, the converter 136 may be an inductance-to-digital converter such as, for example, the Texas Instruments LDC1000 converter. Further details regarding the LDC1000 converter can be found in the document entitled "LDC1000 Inductance-to-Digital Converter" (Texas Instruments document code SNOSCX2C, published September 2013, revised September 2015), the contents of which are incorporated herein by reference in their entirety. Additionally, while the converter 136 is illustrated as being included in the sensor 130, it is also contemplated that the converter 136 may be provided in another location, such as in the controller 140.

The sensor 130 may also include a printed circuit board (PCB) 138, and the inductor 132, capacitor 134 and/or the converter 136 may be mounted on or formed in the PCB 138. The sensor 130 may also include a sensor case 139, and the PCB 138 may be mounted in the sensor case 139. The sensor case 139 may, for example, be formed of a non-conductive or magnetically passive material (i.e., a plastic) such that the sensor case 139 does not significantly interfere with the magnetic field 133. The sensor case 139 may further include a protrusion 139', and the housing case 118 may include one or more alignment openings 119' configured to receive the protrusion 139'. The alignment openings 119' may be positioned such that when the protrusion 139' is received in one of the openings 119', the inductor 132 has a known orientation with respect to the housing case 118. For example, the alignment openings 119' and protrusions 139' may be positioned such that when the sensor 130 is mounted on the body 110 and the arm 122 is in a home position corresponding to a door closed position, the arm 122 is aligned with an alignment region 137 of the sensor 130.

The controller 140 is in communication with the sensor 130, and may further be in communication with the actuation mechanism 150 and/or an external system 160. In the illustrated form, the controller 140 includes a processor 140', a sensor activating unit 141, a sensor receiving unit 142, a position determining unit 143, an action selecting unit 144, a commands unit 145, and a memory 146. As described in further detail below, the sensor activating unit 141 is configured to activate the sensor 130, the sensor receiving unit 142 is configured to receive data from the sensor 130, and the position determining unit 143 is configured to determine a current position based upon information received from the sensor 130. Additionally, the action selecting unit 144 is configured to select an action based on the current position, and the commands unit 145 is configured to issue commands related to the selected action.

The memory 146 is a non-transitory computer readable medium having data stored thereon, and is in communication with the processor 140'. The data stored on the memory 146 may include, for example, one or more sets of instructions 147, one or more look-up tables 148 and/or additional data 149. The instructions 147 may be executed by the processor 140' to cause the processor 140' to perform one or more functions such as, for example, the functions associated with one or more of the units. While the illustrated controller 140 is housed within the body 110, it is also contemplated that the controller 140 may be positioned elsewhere on the operator 100, or may be provided as a component of the external system 160.

The actuation mechanism 150 is configured to regulate the rotational speed of the pinion 112, thereby regulating the angular speed of the door 74 during opening and/or closing events. The actuation mechanism 150 may alternatively be referred to as a pinion control mechanism or a speed regulating mechanism. The actuation mechanism 150 may include an actuator 152 configured to perform actions in response to commands from the controller 140. The actuator 152 may, for example, be an electromechanical actuator such as a motor, solenoid or electromechanical valve.

In certain embodiments, the actuator 152 may be a motor. For example, the operator 100 may be provided as a door actuator, and the motor may rotate the pinion 112 to actively urge the door 74 in the opening direction during opening events. One embodiment of such a door actuator is described below with reference to FIG. 5. In other embodiments, the actuation mechanism 150 may include a valve in a hydraulic damper assembly. For example, the operator 100 may be configured as a door closer which regulates the angular speed of the door 74, but does not actively urge the door 74 to the open position. One embodiment of such a door closer is described below with reference to FIG. 6. In further embodiments, the actuation mechanism 150 may be omitted.

In certain forms, the external system 160 may include a power supply 162 operable to provide electrical power to the operator 100, and may additionally or alternatively include an access control system 164. In certain embodiments, the access control system 164 may receive data from the controller 140 and/or issue commands controller 140. In other forms, the access control system 164 may include one or more of the above-described units. In such embodiments, the access control system 164 may be in direct or indirect communication with the sensor 130 and/or the actuation mechanism 150.

During operation, a varying power signal having predetermined characteristics is supplied to the sensor 130, thereby causing the inductor 132 to generate the magnetic field 133 with known characteristics. In the illustrated embodiment, the varying power signal is an alternating current (AC) power signal having a known voltage and frequency, thereby causing the inductor 132 to generate a magnetic field 133 having a known strength. In other embodiments, the varying power signal may be provided in another manner, such as a pulse or a series of pulses having known voltages and durations. For example, the varying power signal may be provided using pulse width modulation (PWM) techniques.

As the door 74 moves, the position, distance and/or orientation of the target 103 changes with respect to the sensor 130, thereby changing the eddy currents 105 and causing a corresponding variation of one or more characteristics of the sensor 130. The sensor 130 is configured to generate an output signal indicative of one or more of the variable characteristics of the sensor 130. For example, the converter 136 may generate a digital output signal having a value corresponding to the inductance of the inductor 132.

Figure 4:
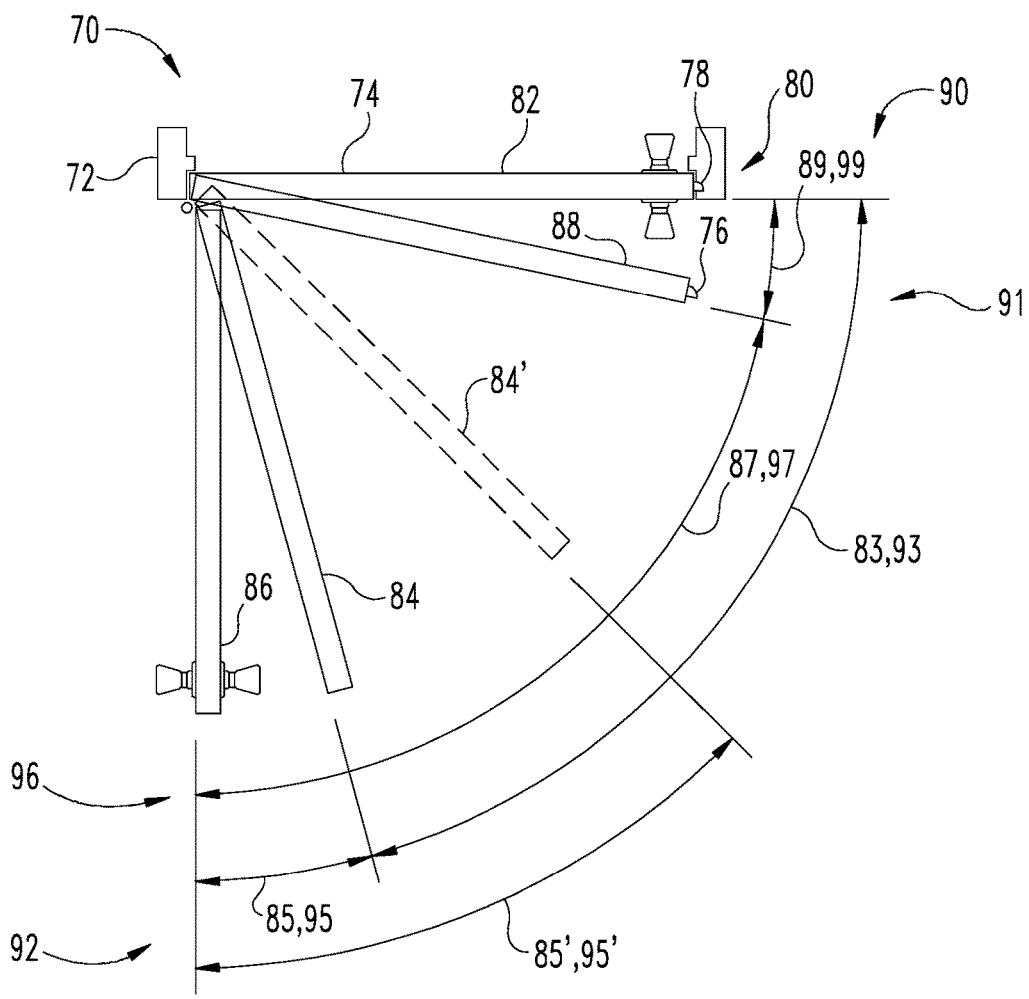
FIG. 4 illustrates various positions of the closure assembly shown in FIG. 1.

FIG. 4 illustrates the closure assembly 70 during an illustrative opening and closing process. The door 74 has a range of positions 80, and moves among the positions 80 through a plurality of movements or motions 90. As will be appreciated, the arm 122 has a plurality of arm positions 180, and each of the arm positions 180 corresponds to one of the door positions 80. Generally speaking, the door 74 moves from a closed position 82 toward an open position 86 during an opening motion 92, and moves from the open position 86 toward the closed position 82 during a closing motion 96. A full open/close motion 91 includes the opening motion 92 and a subsequent closing motion 96. In other words, the full open/close motion 91 includes moving the door 74 from the closed position 82 to the open position 86, and subsequently returning the door 74 to the closed position 82.

During the opening motion 92, the door 74 moves from the closed position 82 to a backcheck position 84 through an opening swing range 83, and subsequently moves from the backcheck position 84 to the open position 86 through a backcheck range 85. The opening motion 92 may thus be considered to include an opening swing movement 93 through the opening swing range 83, and a subsequent backcheck movement 95 through the backcheck range 85. The door 74 may also have a variable backcheck position 84' and a corresponding variable backcheck range 85', as well as a variable backcheck opening motion 95'.

During the closing motion 96, the door 74 moves from the open position 86 to a latching position 88 through a closing swing range 87, and subsequently moves from the latching position 88 to the closed position 82 through a latching range 89. The closing motion 96 may thus be considered to include a closing swing movement 97 through the closing swing range 87, and a subsequent latching movement 99 through the latching range 89.

As the door 74 travels to the closed position 82, the frame 72 urges the latchbolt 76 into the door 74. When the door 74 reaches the closed position 82, the latchbolt 76 becomes aligned with a pocket 78 formed in the frame 72. When the latchbolt 76 becomes aligned with the pocket 78, the latchbolt 76 extends into the pocket 78 under the force of a biasing spring, thereby latching the door 74 to the frame 72. If the door 74 does not reach the fully closed position 82, the latchbolt 76 will not become aligned with the pocket 78, and will therefore be unable to latch the door 74 to the frame 72. As described in further detail below, the door operator 100 may be configured to ensure that the angular speed of the door 74 during the latching movement 99 is sufficient to ensure that the door 74 reaches the fully closed position 82.

Figure 5:
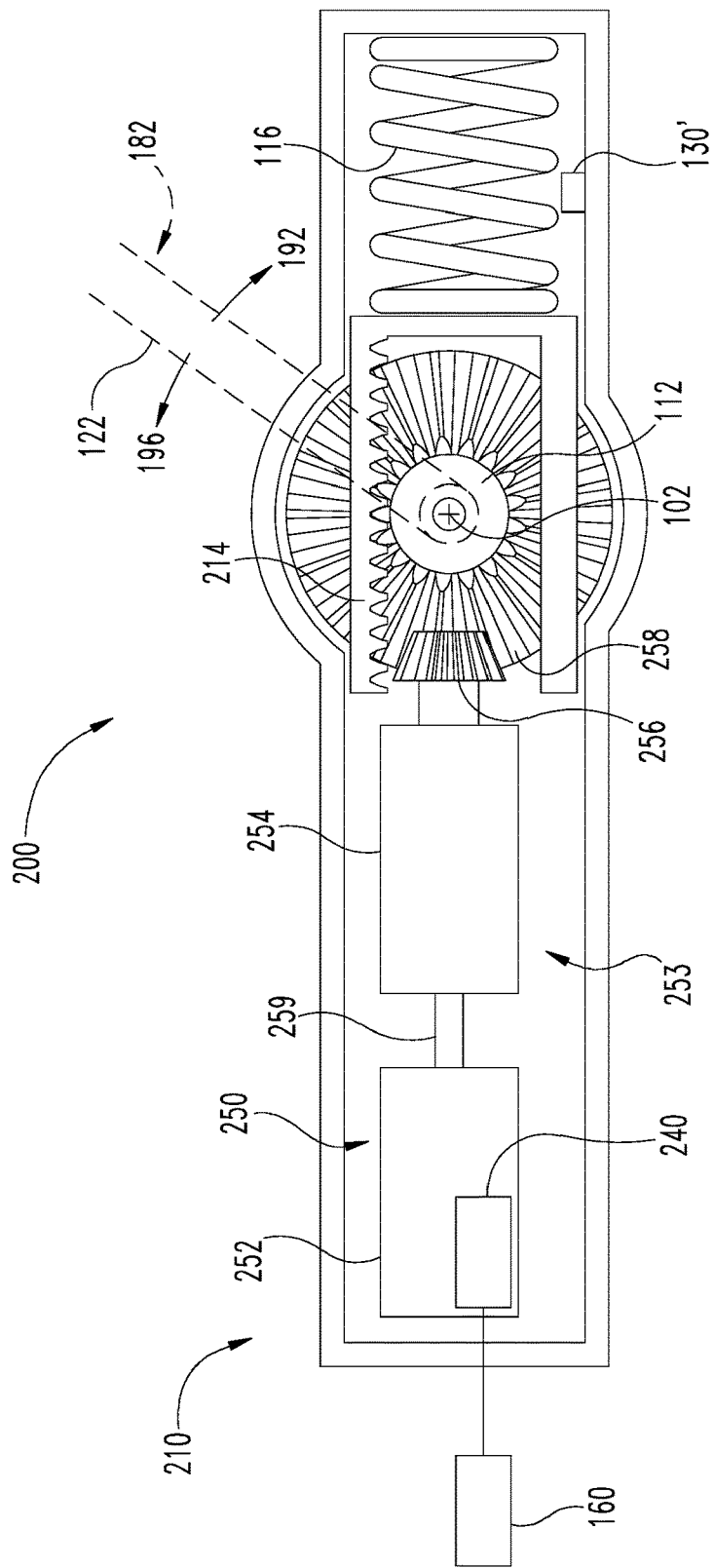
FIG. 5 is a partial plan view of a door actuator according to one embodiment.

With additional reference to FIG. 5, the operator 100 may be provided in the form of a door actuator 200. In such forms, the body 110 may be provided as a door actuator body 210, and the actuation mechanism 150 may be provided in the form of a drive assembly 250. The actuator body 210 houses various internal components of the door actuator 200, including the pinion 112, a rack 214 engaged with the pinion 112, a spring 116 engaged with the rack 214, and a drive assembly 250 engaged with the pinion 112.

In FIG. 5, the arm 122 is illustrated in a home position 182 corresponding to the door closed position 82. In this state, the target arm 122 is aligned with the alignment region 407 of the sensor 400. During the opening motion 92, the door 74 moves in an opening direction, and the pinion 112 and the arm 122 rotate about the rotational axis 102 in a corresponding door-opening direction 192. During the closing motion 96, the door 74 moves in closing direction, and the pinion 112 and the arm 122 rotate about the rotational axis 102 in a corresponding door-closing direction 196.

The illustrated drive assembly 250 includes a motor 252 and a drive train 253 connected between the motor 252 and the pinion 112. While other forms are contemplated, the illustrated drive train 253 includes a reduction gear set 254, a first bevel gear 256, and a second bevel gear 258 which is rotationally coupled with the pinion 112. The motor 252 is operable to rotate an output shaft 259 engaged with the reduction gear set 254. The reduction gear set 254, the first bevel gear 256, and the second bevel gear 258 are sequentially connected in the drive train 253. As a result, rotation of one of the output shaft 259 and the pinion 112 is translated to the other of the output shaft 259 and the pinion 112 via the drive train 253.

As indicated above, the door actuator 200 is operable to actively urge the door 74 in an opening direction. For example, the access control system 164 may issue a door open command to the controller 240. In response to the door open command, the controller 240 may drive the motor 252 with power from the power supply 162, thereby causing the output shaft 259 to rotate in a first direction. The drive train 253 translates rotation of the output shaft 259 in the first direction to rotation of the pinion 112 and the first arm 122 in a door-opening direction 192 (i.e., clockwise in FIG. 5).

Rotation of the pinion 112 in the door-opening direction 192 drives the rack 214 linearly against the biasing force of the spring 116, thereby compressing the spring 116. Additionally, rotation of the first arm 122 in the door-opening direction 192 urges the door 74 in an opening direction. In certain embodiments, the force provided by the drive assembly 250 may be sufficient to move the door 74 to an open position, thereby providing the door actuator 200 with a "powered opening" function. In other embodiments, the drive assembly 250 may provide only enough force to assist a manual opening of the door 74, thereby providing the door actuator 200 with a "powered assist" function.

In certain embodiments, the door actuator 200 may include a "hold-open" function in which the actuator 200 retains the door 74 in an open position, such as the fully-open position 86. For example, when the door 74 reaches the open position 86, the controller 240 may issue a hold-open command to the motor 252. In response to the hold-open command, the motor 252 may retain the rotational position of the output shaft 259. As a result, the pinion 112 is unable to rotate in a door-closing direction 196, and the arm assembly 120 retains the angular position of the door 74.

When installed in the closure assembly 70, the door actuator 200 may be operable to control a closing speed of the door 74. For example, when the door 74 begins to move in a closing direction, the controller 240 may issue a door close command to the motor 252. In certain embodiments, the motor 252 may drive the output shaft 259 in a second rotational direction at a predetermined speed. In other embodiments, the motor 252 may resist rotation of the output shaft 259 with a predetermined force. In such forms, expansion of the spring 116 linearly moves the rack 214, thereby driving the pinion 112 in the door-closing direction 196 against the resistive force provided by the drive assembly 250.

Figure 6:
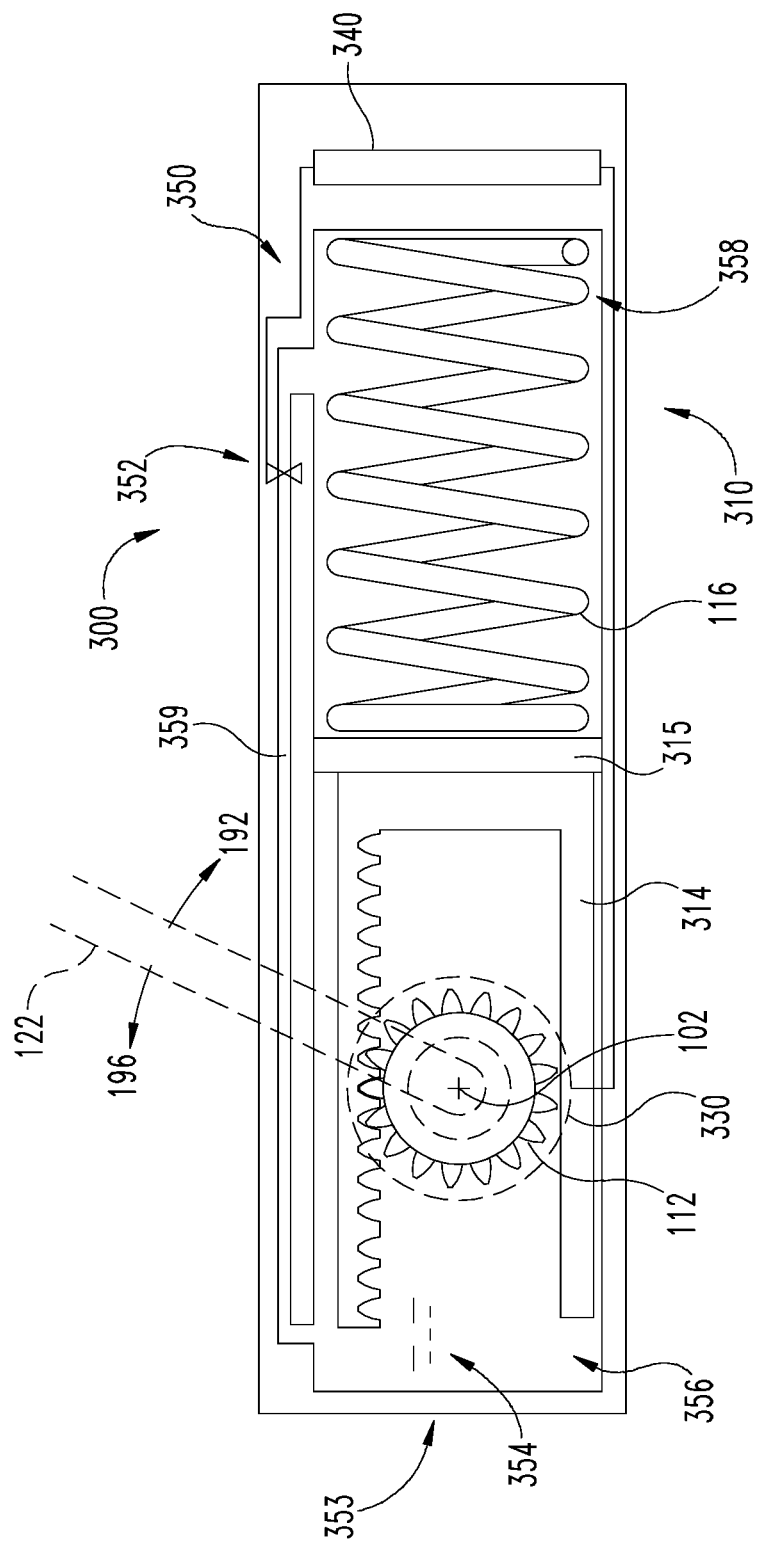
FIG. 6 is a partial plan view of a door closer according to one embodiment.

With additional reference to FIG. 6, the door operator 100 may be provided in the form of a door closer 300. In such forms, the body 110 may be provided as a door closer body 310, and the actuation mechanism 150 may be provided in the form of a hydraulic damper assembly 350. The door closer 300 is similar to the above-described door actuator 200, and unless indicated otherwise, similar reference characters are used to indicate similar elements and features. For example, the closer body 310 houses the pinion 112, a rack 314 is engaged with the pinion 112, and a spring 116 is engaged with the rack 314. In the interest of conciseness, the following description of the door closer 300 focuses primarily on elements and features which differ from those described above with reference to the door actuator 200.

As noted above, in the illustrated form, the actuating mechanism 150 is provided as a hydraulic assembly 350. The hydraulic assembly 350 includes an actuator in the form of an electrically-operable valve 352, a hydraulic chamber 353 defined within the body 310, and hydraulic fluid 354 contained within the hydraulic chamber 353. The hydraulic chamber 353 includes a first chamber 356, a second chamber 358, and a passage 359 in fluid communication with the first and second chambers 356, 358. The hydraulic assembly 350 may further include a gasket 315 mounted on the end of the rack 314, thereby forming a seal between the first and second chambers 356, 358.

During operation of the closer 300, the rack 314 moves linearly in a manner similar to that described above with reference to the rack 214 of the door actuator 200. During an opening event, the arm assembly 320 drives the pinion 112 in a door-opening direction 192 (i.e., clockwise in FIG. 6), thereby causing a corresponding linear movement of the rack 314 (i.e., to the right in FIG. 6) to compress the spring 116. This movement of the rack 314 causes expansion of the first chamber 356 and contraction of the second chamber 358 as the gasket 315 correspondingly moves with the rack 314. As a result, the hydraulic fluid 354 is forced out of the contracting second chamber 358 and into the expanding first chamber 356 via the passage 359. During a subsequent closing event, the compressed spring 116 urges the rack 314 in the opposite direction (i.e., to the left in FIG. 6), thereby causing the pinion 112 to urge the arm assembly 320 in a door-closing direction 196. This movement of the rack 314 causes the first chamber 356 to contract, thereby urging hydraulic fluid 354 through the passage 359 and into the expanding second chamber 358.

When the closer 300 is installed in the closure assembly 70, the hydraulic assembly 350 resists pivotal movement of the door 74 by resisting linear movement of the rack 314. The resistive force provided by the hydraulic assembly 350 depends on a number of factors including, for example, the effective cross-sectional area of the passage 359. For example, when the passage 359 has a large cross-sectional area, the hydraulic fluid 354 may flow relatively easily between the chambers 356, 358. As a result, the hydraulic assembly 350 provides relatively little or minimal resistance to rotation of the pinion 112. Conversely, a smaller cross-sectional area of the passage 359 may result in a greater resistance to rotation of the pinion 112. Additionally, when the passage 359 is closed, the hydraulic fluid 354 is unable to flow between the chambers 356, 358, and rotation of pinion 112 is thereby prevented. Thus, the resistance provided by the hydraulic assembly 350 can be adjusted by controlling the effective cross-sectional area of the passage 359.

In the illustrated form, the valve 352 is operable to adjust the effective cross-sectional area of the passage 359. For example, the valve 352 may have a first terminal position in which the passage 359 has a first effective cross-sectional area, and a terminal second position in which the passage 359 has a second and lesser effective cross-sectional area. In certain forms, the first terminal position may be a fully open position, and/or the second terminal position may be a fully closed position. The valve 352 may also have at least one intermediate position between the first and second terminal positions. In certain forms, the valve 352 may be operable throughout a continuous range of positions between the first and second terminal positions.

The valve 352 is in communication with the controller 340, and is configured to move among the plurality of positions in response to commands from the controller 340. Thus, the controller 340 is operable to adjust the effective cross-sectional area of the passage 359, thereby controlling the resistance provided by the hydraulic assembly 350.

Figure 7:
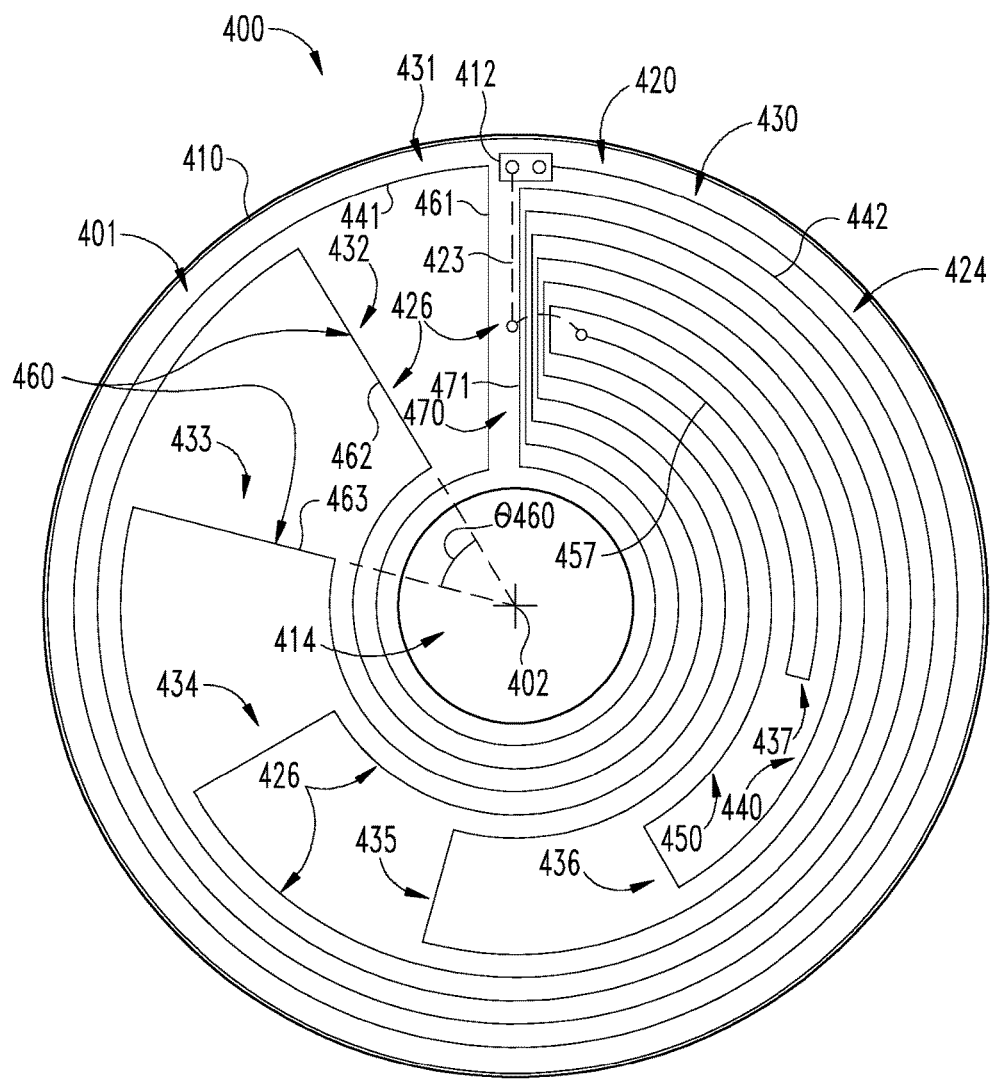
FIGS. 7 and 8 illustrate an inductive rotational position sensor according to one embodiment.

FIG. 7 illustrates an inductive sensor 400 according to one embodiment. The sensor 400 is one example of the above-described sensor 130. The sensor 400 includes a PCB 410 corresponding to the PCB 138. The PCB 410 may, for example, be mounted in the sensor case 139. The sensor 400 includes an inductor 401, which in the illustrated form is provided on the PCB 410. More specifically, the inductor 401 is defined by a trace 420 formed on the PCB 410, and the trace 420 defines a plurality of nested coils 430. The PCB 410 may also include a header 412 configured for connection with the controller 140. The PCB 410 also has an opening 414. The opening 414 corresponds to the sensor opening 131, and is configured to receive the pinion 112 and/or the hub 121 such that the pinion 112 can be connected to the arm 122 through the opening 414.

The trace 420 includes a plurality of trace segments which define the plurality of coils 430. More specifically, the illustrated trace 420 includes a set of arcuate trace segments 424 and a set of additional trace segments 426. The set of arcuate trace segments 424 includes a plurality of outer segments 440 and a plurality of inner segments 450, and the set of additional trace segments 426 includes a plurality of end segments 460 and a plurality of connector segments 470. In the illustrated form, each of the additional trace segments 426 is substantially linear and connects two of the arcuate trace segments 424. As described in further detail below, it is also contemplated that the additional trace segments 426 may be non-linear, or may be curvilinear.

Each of the coils 430 includes one of the outer segments 440, one of the inner segments 450, and one of the end segments 460. For example, the outermost or first coil 431 includes a first outer segment 441, a first inner segment 451, and a first end segment 461. Additionally, the coils 430 are nested within one another such that each of the coils 430 is at least one of an outer coil and an inner coil. For example, the second coil 432 is nested within the first coil 431, and the third coil 433 is nested within the second coil 432. The second coil 432 may therefore be considered to constitute both an inner coil (i.e., with respect to the first coil 431) and an outer coil (i.e., with respect to the third coil 433). Additionally, each of the connector segments 470 connects an inner coil to an outer coil, and may therefore be considered to define a second end of the inner coil and/or the outer coil. For example, the first connector segment 471 connects the outer first coil 431 to the inner second coil 432.

In the illustrated form, the connector segments 470 are tightly packed together, whereas the end segments 460 are spaced apart from one another by a predetermined angle θ460 with respect to a reference point 402. For example, the end segment 462 of the second coil 432 is illustrated as being angularly offset from the end segment 463 of the third coil 433 by the offset angle θ460. In the illustrated embodiment, the reference point 402 constitutes the center of the opening 414 and corresponds to the rotational axis 102 of the pinion 112. Additionally, the arcuate trace segments 424 are offset from one another by a radial offset distance d424.

As described in further detail below, the angle θ460 between the end segments 460 determines the angular sensitivity or granularity of the sensor 400. In the illustrated form, each pair of adjacent end segments 460 defines the same offset angle θ460. In other forms, the offset angle θ460 may vary. Additionally, the number of coils 430 that can be formed on the PCB 410 depends, at least in part, on the distance d424 between the arcuate trace segments 424. While each pair of adjacent arcuate segments 424 in the illustrated embodiment defines the same offset distance d424, it is also contemplated that the offset distance may vary.

Figure 8:
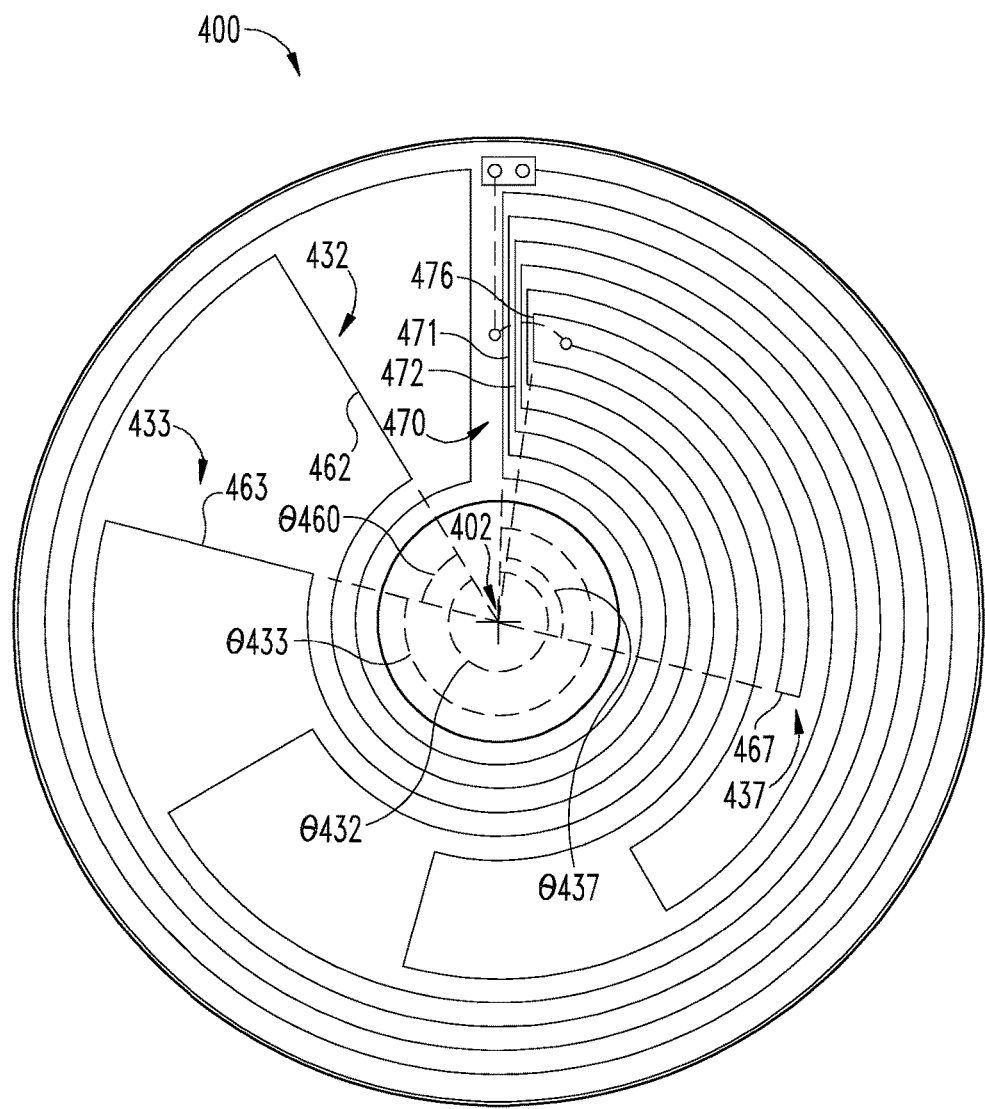

With additional reference to FIG. 8, each of the coils 430 subtends an angle θ430 about the reference point 402. The subtended angle θ430 of each coil 430 is defined by one of the end segments 460 and one of the connector segments 470. For example, the first coil 431 has a first subtended angle θ431, which is an angle defined by the first end segment 461 and the first connector segment 471 about the reference point 402.

In the interest of more clearly illustrating the features of the sensor 400, the sensor 400 is depicted as including seven coils 431-437. However, it should be understood that the sensor 400 may include more or fewer coils 430 depending on a number of factors including, for example, the size of the PCB 410 and the minimum radial offset d424 allowed by manufacturing tolerances. Additionally, the sensitivity or granularity of the sensor 400 may be adjusted by increasing or decreasing the offset angles θ460 defined between the end segments 460. As described in further detail below, the end offset angles θ460 and/or the distance by which the connector segments 470 are offset from one another may be selected such that an inductance profile of the sensor 400 exhibits features indicative of a corresponding door position 80. Furthermore, while the illustrated sensor 400 includes a single-layer PCB 410, it is also contemplated that a multi-layer PCB may be utilized. In such forms, each of the PCB layers may include a trace 420, and the traces 420 may be connected in series in order to increase the base inductance and sensitivity of the sensor 400.

Figure 9:
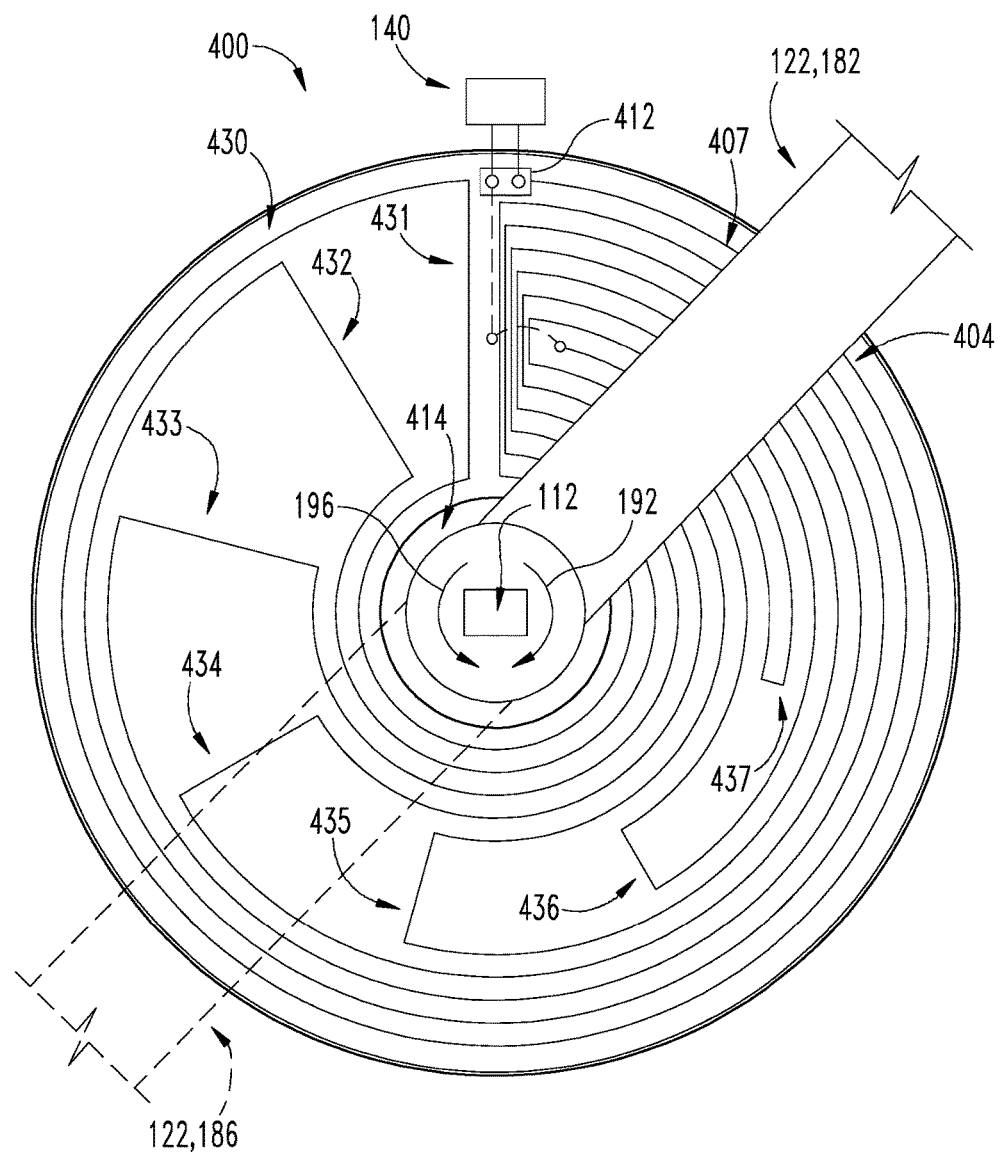
FIG. 9 illustrates the sensor of FIGS. 7 and 8 along with a portion of the door operator shown in FIG. 1.

With additional reference to FIG. 2, in certain forms, the inductive sensor 130 of the door operator 100 may be provided in the form of the sensor 400 described above. For example, FIG. 9 illustrates the sensor 400 in communication with the controller 140, and with the first arm 122 connected to the pinion 112 via the opening 414 in the sensor 400. When assembled, the arm 122 extends over the sensor 400 and overlaps at least some of the coils 430, thereby defining an overlapped subset 404 of the coils 430. As such, when the arm 122 is inductively linked to the inductor 401, the arm 122 affects the variable characteristics of the sensor 400.

Figure 10:
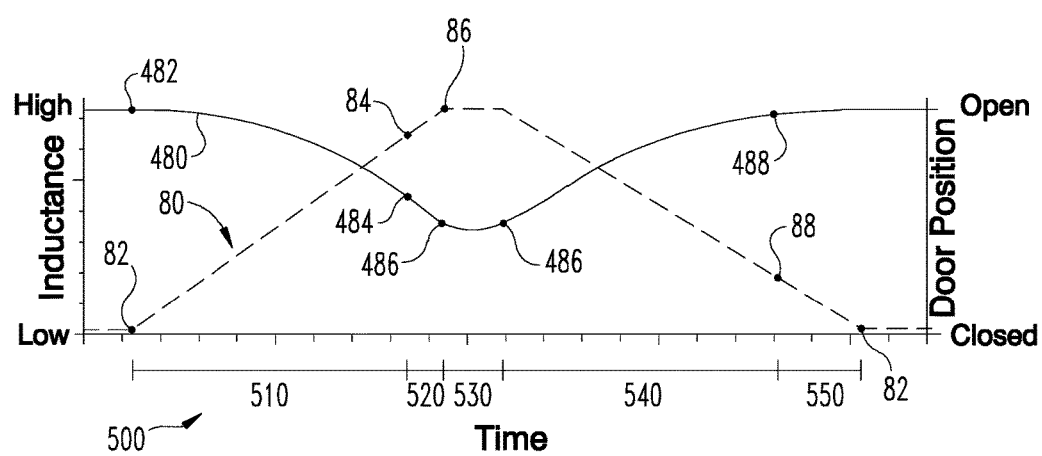
FIG. 10 is a graphic representation of inductance and door position versus time during a process utilizing the inductive sensor shown in FIGS. 7-9.

With continued reference to FIGS. 2 and 9 and additional reference to FIGS. 4 and 10, further details regarding operation of the door operator 100 including the sensor 400 will now be provided. FIG. 10 is an exemplary time chart illustrating the door positions 80 and the inductance 480 of the sensor 400 during a door opening and closing process 500, which may be performed during a full open/close motion 91. While the illustrated time chart depicts the inductance 480 as a function of time, it should be understood that other variables may be utilized such as, for example, the impedance. Furthermore, while the illustrated graph directly correlates inductance 480 and door position 80, it is to be understood that the inductance 480 may only be indirectly correlated to the door position 80. For example, the inductance 480 may be indicative of the arm position 180, which in turn correlates to the door position 80. As will be appreciated, the correlation between arm position 180 and door position 80 may depend upon a number of factors, such as the configuration of the door operator 100. Further details regarding exemplary correlations between the arm position 180 and door position 80 are provided below with reference to FIG. 21.

The process 500 generally includes an opening swing procedure 510, a backcheck procedure 520, a hold-open procedure 530, a closing swing procedure 540, and a latching procedure 550. Each of the procedures 510-550 may correspond to one of the door positions 80 and one of the door movements 90. For example, the opening swing procedure 510 may be performed during the opening swing movement 93 as the door 74 travels through the opening swing range 83 from the closed position 82 to the backcheck position 84. The backcheck procedure 520 may be performed during the backcheck movement 95 as the door 74 travels through the backcheck range 85 from the backcheck position 84 to the open position 86. The hold-open procedure 530 may be performed to retain the door 74 in the open position 86. The closing swing procedure 540 may be performed during the closing swing movement 97 as the door 74 travels through the closing swing range 87 from the open position 86 to the latching position 88. The latching procedure 550 may be performed during the latching movement 99 as the door 74 travels through the latching range 89 from the latching position 88 to the closed position 82. Further details regarding an exemplary form of the process 500 are provided below with reference to FIG. 17.

When the door 74 is in the closed position 82, the arm 122 may be in a home position 182 (FIG. 9) in which it is aligned with the alignment region 407 and overlaps each of the coils 430 such that the overlapped subset 404 includes each of the coils 430. As a result, the inductance 480 of the sensor 400 is at a maximum value 482. The maximum inductance value 482 may therefore be considered as indicative of the home position 182 of the arm 122 and/or the closed position 82 of the door 74. As the door 74 begins the opening swing movement 93, the arm 122 begins to rotate in a door-opening direction 192 (i.e., clockwise in FIG. 9). The inductance 480 maintains a relatively constant level until the arm 122 begins to pass the end segment 467 of the innermost coil 437, at which point the inductance 480 begins to decrease. The decrease in inductance 480 therefore indicates that the opening swing movement 93 is in progress.

Continued rotation in the door-opening direction 192 causes the arm 122 to overlap fewer of the coils 430, thereby altering the overlapped subset 404. For example, the arm 122 rotates beyond the end segment 467 of the innermost coil 437, thereby removing the coil 437 from the overlapped subset 404. As the number of coils 430 in the overlapped subset 404 decreases, the inductance 480 correspondingly decreases. Thus, the inductance 480 decreases in response to continued rotation of the arm 122, and eventually reaches a backcheck threshold value 484 indicative of the backcheck position 84. The process 500 may enter the backcheck procedure 520 in response to the inductance falling below the backcheck threshold 484.

Continued rotation in the door-opening direction 192 causes the arm 122 to overlap fewer of the coils 430 as the arm 122 rotates beyond the end segments 466, 465 of the coils 436, 435, thereby causing a continued decrease in the inductance 480. When the arm 122 reaches a door open position 186, the inductance 480 has an open threshold value 486 indicative of the open position 86. The process 500 may enter the hold-open procedure 530 to retain the door 74 in the open position 86 in response to the open threshold value 486. After a predetermined amount of time, the hold-open procedure 530 may cease, thereby causing the door 74 to begin the closing movement 96 under the force of the spring.

As the door 74 begins the closing movement 96, the arm 122 begins to rotate in a door-closing direction 196 (i.e., counter-clockwise in FIG. 9), thereby increasing the number of coils 430 in the overlapped subset and causing a corresponding increase in the inductance 480. When the inductance 480 rises above the open threshold value 486, the process 500 may enter the closing swing procedure 540. As the door passes through the closing swing range 87, the arm 122 rotates in the door-closing direction 196, thereby causing the inductance 480 to correspondingly increase.

When the door 74 reaches the latching position 88, the inductance has a latching threshold value 488. The latching threshold value 488 is therefore indicative of the latching position 88. The process 500 may enter the latching procedure 550 in response to the inductance 480 rising above the latching threshold value 488. As the door 74 moves through the latching range 89, the arm 122 returns to the home position 182, thereby causing the inductance 480 to increase to the closed threshold value 482. The process 500 may end when the inductance 480 reaches the closed threshold value 482, or may continue for a predetermined amount of time thereafter.

In certain forms, the threshold values 482, 484, 486, 488 may be pre-set values included in the memory 146 at the time of installation. Additionally or alternatively, the values may be determined during an installation or maintenance procedure. Furthermore, the memory 146 may be provided with additional backcheck threshold values 484 corresponding to one or more variable backcheck positions 84'.

In the illustrated form, the inductance 480 is at a maximum when the door 80 is in the closed position 82, and is at a minimum when the door is in the open position 86. In other forms, a sensor may be configured such that the maximum and minimum values of the inductance 480 respectively correspond to the open position 86 and the closed position 82. In further embodiments, the maximum and/or minimum values of the inductance 480 need not correspond to the closed and/or open positions 82, 86. In such forms, the maximum and/or minimum values of the inductance 480 may instead be provided at inflection points indicating another door position, for example as described below with reference to FIGS. 11 and 12.

Figure 11:
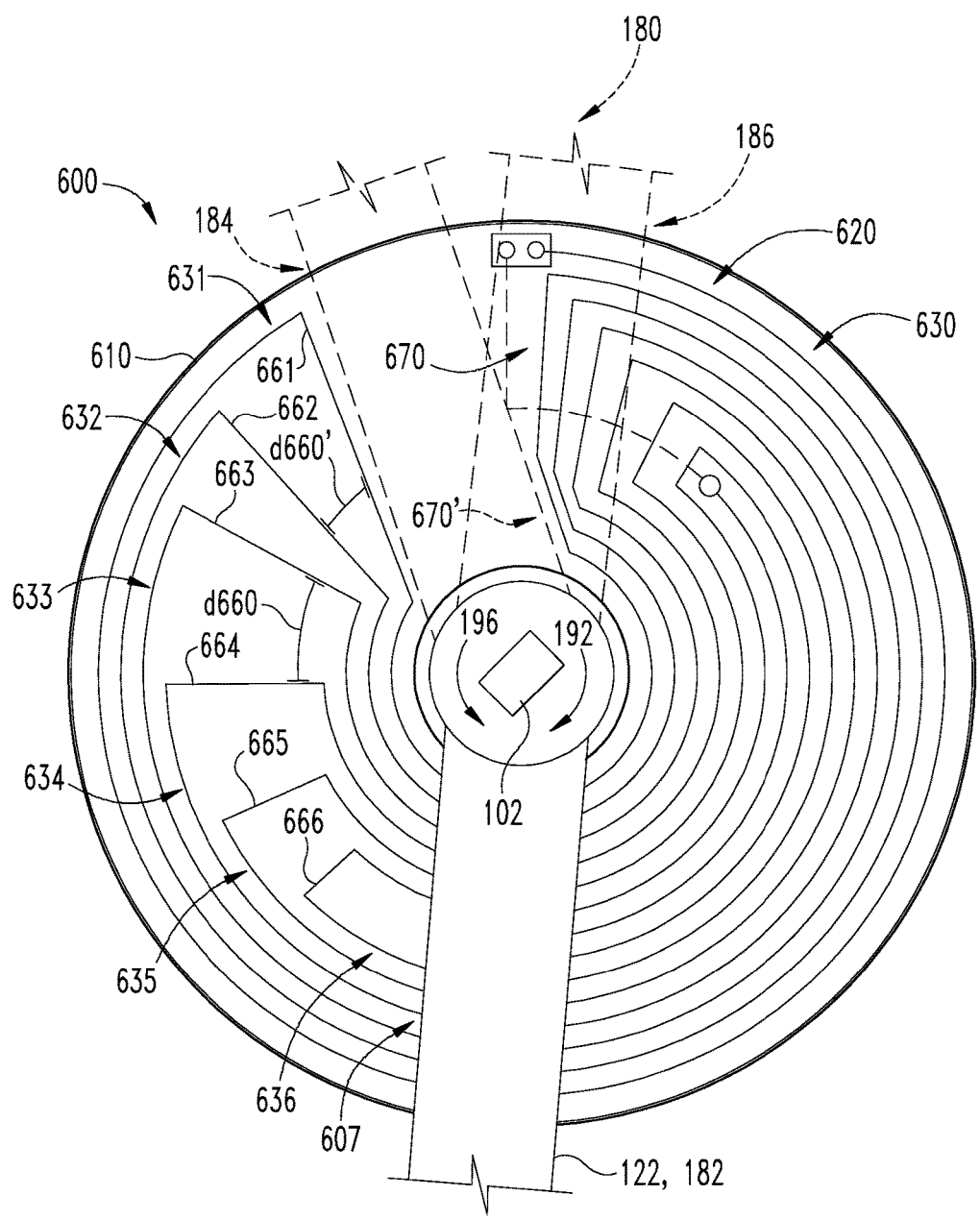
FIG. 11 illustrates an inductive rotational position sensor according to another embodiment with a portion of the door operator shown in FIG. 1

FIG. 11 illustrates an inductive sensor 600 according to another embodiment. The sensor 600 is substantially similar the sensor 400 described above. Unless indicated otherwise, similar reference characters are used to indicate similar elements and features. For example, the sensor 600 includes a PCB 610 including a trace 620 which defines a plurality of nested coils 630. In the interest of conciseness, the following description of the inductive sensor 600 focuses primarily on elements and features which are different from those described above with reference to the inductive sensor 400.

While the end segments 460 in the sensor 400 are offset from one another by a substantially constant offset angle θ460, the end segments 660 in the sensor 600 are offset from one another by varying offset angles. More specifically, the end segments 660 of the outermost coils 630 are positioned closer to one another than the end segments 660 of the innermost coils 630. For example, the end segments 661, 662 of the outermost coils 631, 632 are offset from one another by a first angle θ661, and the end segments 665, 666 of the inner coils 635, 636 are offset from one another by a second offset angle θ665 which is greater than the first offset angle θ661. Additionally, while the connector segments 470 in the sensor 400 are tightly packed, the connector segments 670 in the sensor 600 are spaced apart from one another. As a result of the differences in configuration, the sensor 600 will generate a different inductance profile during the process 500 than the sensor 400.

Figure 12:
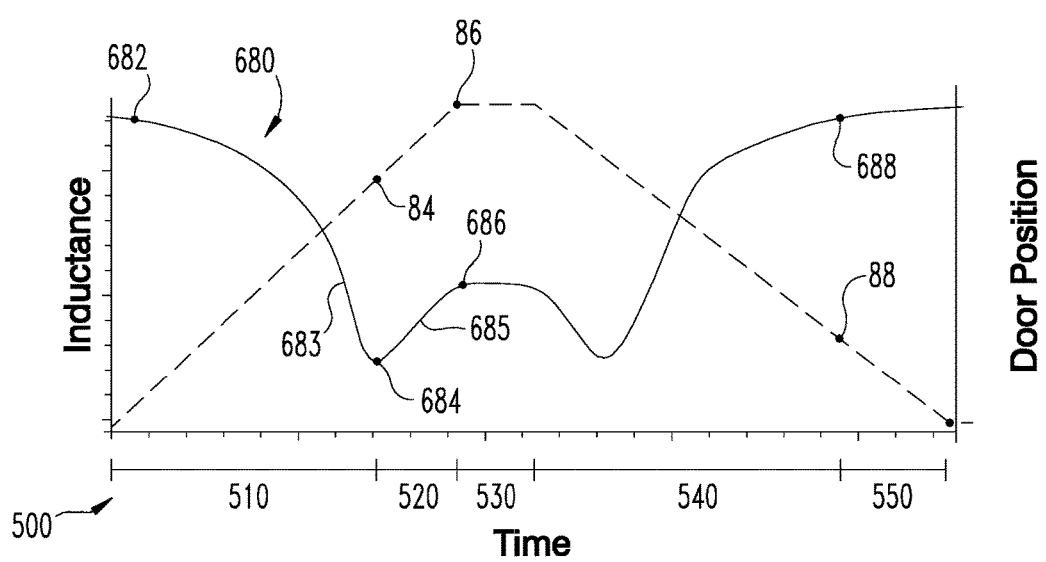
FIG. 12 is a graph of inductance and door position versus time during a process utilizing the inductive sensor shown in FIG. 11.

With additional reference to FIG. 12, illustrated therein is an exemplary time chart depicting the inductance 680 of the sensor 600 during the process 500. When the arm 122 is in the home position 182, it is aligned with the alignment region 607, which includes each of the coils 630. As a result, each coil 630 is overlapped by the arm 122, and is therefore included in the overlapped subset 604. In this state, the inductance 680 has a closed threshold value 682 indicative of the door closed position 82. As the door 74 begins the opening swing movement 92, the arm 122 begins to rotate in the door-opening direction 192. Due to the fact that the end segments 663-667 of the inner coils 633-637 are offset from one another by a relatively large offset distance d660, the inductance 680 initially falls with a relatively gradual slope.

As the arm 122 continues to rotate in the door-opening direction 192, it begins to cross the end segments 661-663 of the outer coils 631-633, thereby removing the coils 631-633 from the overlapped subset 604. Due to the fact that the end segments 661-663 of the outer coils 631-633 are offset from one another by a relatively small offset distance d660', the inductance 680 begins to reduce with a relatively steep negative slope 683 as the door 74 approaches the backcheck position 84.

When the door 74 reaches the backcheck position 84, the arm 122 reaches a corresponding backcheck position 184 in which it overlaps the fewest amount of coils 630. In other words, with the arm 122 in the backcheck position 184, the number of coils 630 in the overlapped subset 604 is at a minimum. In the illustrated form, the connector segments 670 include angled segments 670' which are positioned such that the arm 122 does not overlap any of the coils 630 when in the backcheck position 184. As the door 74 travels past the backcheck position 84, the arm 122 begins to cross the connector segments 670, thereby expanding the overlapped subset 604 and causing the inductance 680 to rise with a positive slope 685.

In certain forms, the alignment opening 119' may be positioned such that when the protrusion 139' is received in the opening 119', the inductive coil 601 has a known orientation with respect to the casing 118. For example, the alignment opening 119' may be positioned such that each of the arm positions 180 corresponds to a known overlapped subset 604. Additionally, the case 118 may include a plurality of the alignment openings 119', each corresponding to a particular orientation of the inductor 601. In such forms, the sensor 600 may be mounted in a plurality of orientations, each corresponding to a particular configuration of the door operator 100 and/or closure assembly 70.

As can be seen from the foregoing, the inductance 680 of the sensor 600 has a negative slope 683 as the door 74 approaches the backcheck position 84, and a positive slope 685 as the door 74 travels in the backcheck motion 95. The sensor 600 thus generates an inflection point 684 indicative of the backcheck position 84. It is also contemplated that the sensor 600 may be configured such that an inflection point is generated at additional or alternative points of interest such as, for example, the latching position 88.

In the embodiments described thus far, the inductive sensor 130 is provided as a rotational position sensor operable to sense the rotational position of the arm 122. It is also contemplated that an inductive sensor may be provided as a linear position sensor operable to sense the linear position of another element of the operator 100. For example, FIG. 5 illustrates a linear position sensor 130' associated with the spring 116. Further details regarding an example of such an embodiment will now be provided with reference to FIGS. 13 and 14.

Figure 13:
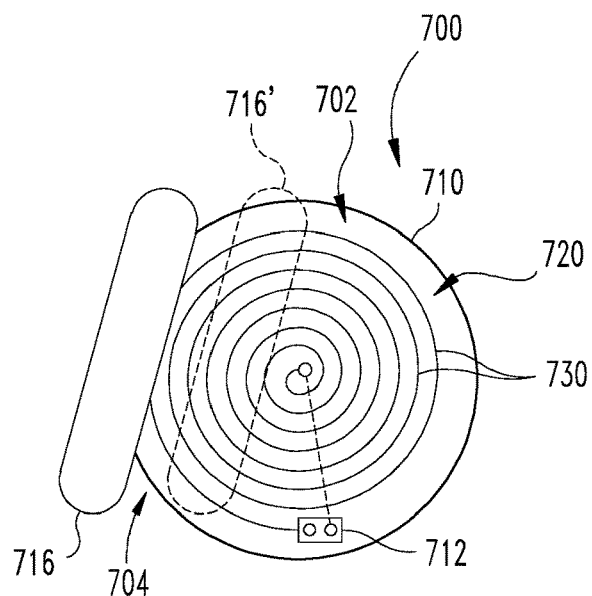
FIG. 13 illustrates an inductive linear position sensor according to one embodiment along with a portion of the door operator shown in FIG. 1.

FIG. 13 illustrates an inductive linear position sensor 700 associated with a spring coil 716. The spring coil 716 may, for example, be a coil of the spring 116 in the door actuator 200 illustrated in FIG. 5. The sensor 400 includes an inductor 701, which in the illustrated form is provided on a printed circuit board (PCB) 710. More specifically, the inductor 701 is defined by a spiral trace 720 including a plurality of coils 730. The sensor 700 also includes a header 712 which may, for example, be configured for connection to the controller 140.

Figure 14:
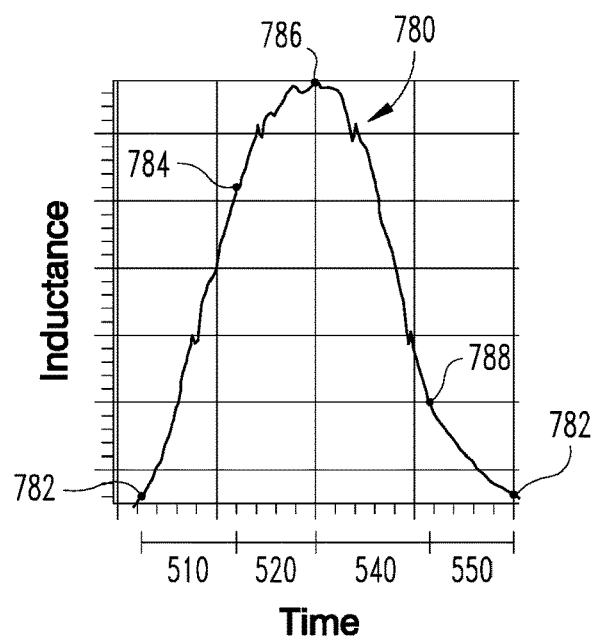
FIG. 14 is a graphic representation of inductance versus time during a process utilizing the inductive sensor shown in FIG. 13.

FIG. 14 is a graph of the inductance 780 of the sensor 700 as the door 74 travels through the positions depicted in FIG. 4. When the door 74 is in the closed position 82, the spring coil 716 overlaps a relatively small portion of the inductor 701. For example, in the illustrated form, the spring coil 716 overlaps a single inductor coil 730, and the overlapped subset 704 includes only the outermost inductor coil 730.

As the door 74 moves toward the open position 84, the spring 116 becomes compressed, thereby causing the spring coil 716 to move in a first direction (i.e., to the right in FIG. 13). As a result, the spring coil 716 begins to overlap additional inductor coils 730, thereby expanding the overlapped subset 704 and increasing the inductance 780. When the door 74 reaches the backcheck position 84, the inductance 780 has a backcheck threshold value 784. When the door 74 reaches the open position 86, the spring coil 716 is in a corresponding position 716', thereby causing an open threshold value 786 of the inductance 780.

As the door 74 begins to close, the spring 116 begins to expand, thereby causing the spring coil 716 to travel in an opposite direction (i.e., to the left in FIG. 13). As the spring coil 716 moves across the inductor coils 730, the overlapped subset 704 begins to decrease, thereby causing a corresponding decrease in the inductance 780. When the door 74 reaches the latching position 88, the inductance 780 has a latching threshold value 788. As the door 74 returns to the closed position 82, the inductance 780 falls to the closed threshold value 782.

While the illustrated inductance curve 780 is substantially bell-shaped, it is also contemplated that the sensor 700 may be configured to produce another form of inductance curve. For example, the sensor 700 may be sized and positioned such that the spring coil 716 is located in the center of the inductor 701 when the door 74 is in the backcheck position 84, such that the backcheck threshold value 784 is a peak of the curve. Additionally or in the alternative, the sensor 700 may be sized and positioned such that a second spring coil begins to overlap the inductor 701 when the door 74 reaches the latching position 88. As a result, the inductance curve may have a trough corresponding to the latching threshold value 788.

In the illustrated form, the plane of the sensor 700 is substantially parallel to the direction in which the target element 716 moves. In other words, movement of the door 80 causes the target element 716 to move across the inductor coil 730, thereby changing the inductance of the inductor 701. It is also contemplated that the plane of the sensor 700 may have a different orientation with respect to the movement direction of the target element 716. For example, the sensor 700 may be positioned between the spring 116 and the rightmost inner wall of the actuator 200 illustrated in FIG. 5. In such forms, compression or expansion of the spring 116 causes the spring coils to move within the magnetic field generated by the inductor 701, thereby causing a variation in the inductance of the sensor 700.

Figure 15:
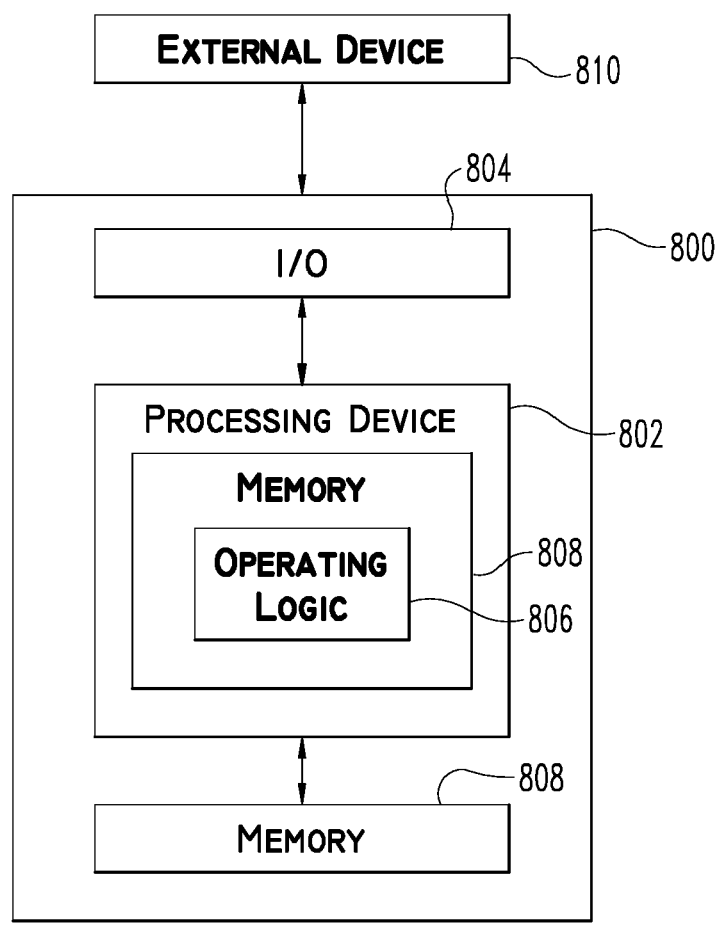
FIG. 15 is a schematic block diagram of a computing device which may be utilized in certain embodiments.

FIG. 15 is a schematic block diagram of a computing device 800 which may be used in certain embodiments. The computing device 800 is one example of a computer, server, mobile device, reader device, or equipment configuration which may be utilized in connection with the door operator 100 shown in FIG. 1. For example, the controller 140 may be provided in the form of the computing device 800. The computing device 800 generally includes a processing device 802, an input/output device 804, memory 806, and operating logic 808. Furthermore, the computing device 800 communicates with one or more external devices 810, such as the sensor 130, actuation mechanism 150, and/or external system 160.

The input/output device 804 allows the computing device 800 to communicate with the external device 810. For example, the input/output device 804 may be a network adapter, network card, interface, or a port (e.g., a USB port, serial port, parallel port, an analog port, a digital port, VGA, DVI, HDMI, FireWire, CAT 5, or any other type of port or interface). The input/output device 804 may be comprised of hardware, software, and/or firmware. It is also contemplated that the input/output device 804 may include more than one of these adapters, cards, or ports.

The external device 810 may be any type of device that allows data to be inputted or outputted from the computing device 800. For example, the external device 810 may be a mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 810 may be integrated into the computing device 800. It is further contemplated that there may be more than one external device in communication with the computing device 800.

The processing device 802 can be of a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of processing device 802 with multiple processing units, distributed, pipelined, and/or parallel processing can be utilized as appropriate. The processing device 802 may be dedicated to performance of just the operations described herein or may be utilized in one or more additional applications. In the depicted form, the processing device 802 is of a programmable variety that executes algorithms and processes data in accordance with operating logic 808 as defined by programming instructions (such as software or firmware) stored in memory 806. Alternatively or additionally, the operating logic 808 for processing device 802 is at least partially defined by hardwired logic or other hardware. The processing device 802 can be comprised of one or more components of any type suitable to process the signals received from input/output device 804 or elsewhere, and provide desired output signals. Such components may include digital circuitry, analog circuitry, or a combination of both.

The memory 806 may be of one or more types, such as a solid-state variety, electromagnetic variety, optical variety, or a combination of these forms. Furthermore, the memory 806 can be volatile, nonvolatile, or a combination of these types, and some or all of memory 806 can be of a portable variety, such as a disk, tape, memory stick, cartridge, or the like. In addition, the memory 806 can store data that is manipulated by the operating logic 808 of the processing device 802, such as data representative of signals received from and/or sent to the input/output device 804 in addition to or in lieu of storing programming instructions defining the operating logic 808, just to name one example. As shown in FIG. 8, the memory 806 may be included with the processing device 802 and/or coupled to the processing device 802.

The processes in the present application may be implemented in the operating logic 808 as operations by software, hardware, artificial intelligence, fuzzy logic, or any combination thereof, or at least partially performed by a user or operator. In certain embodiments, units represent software elements as a computer program encoded on a non-transitory computer readable medium, wherein the controller 140 performs the described operations when executing the computer program.

Figure 16:
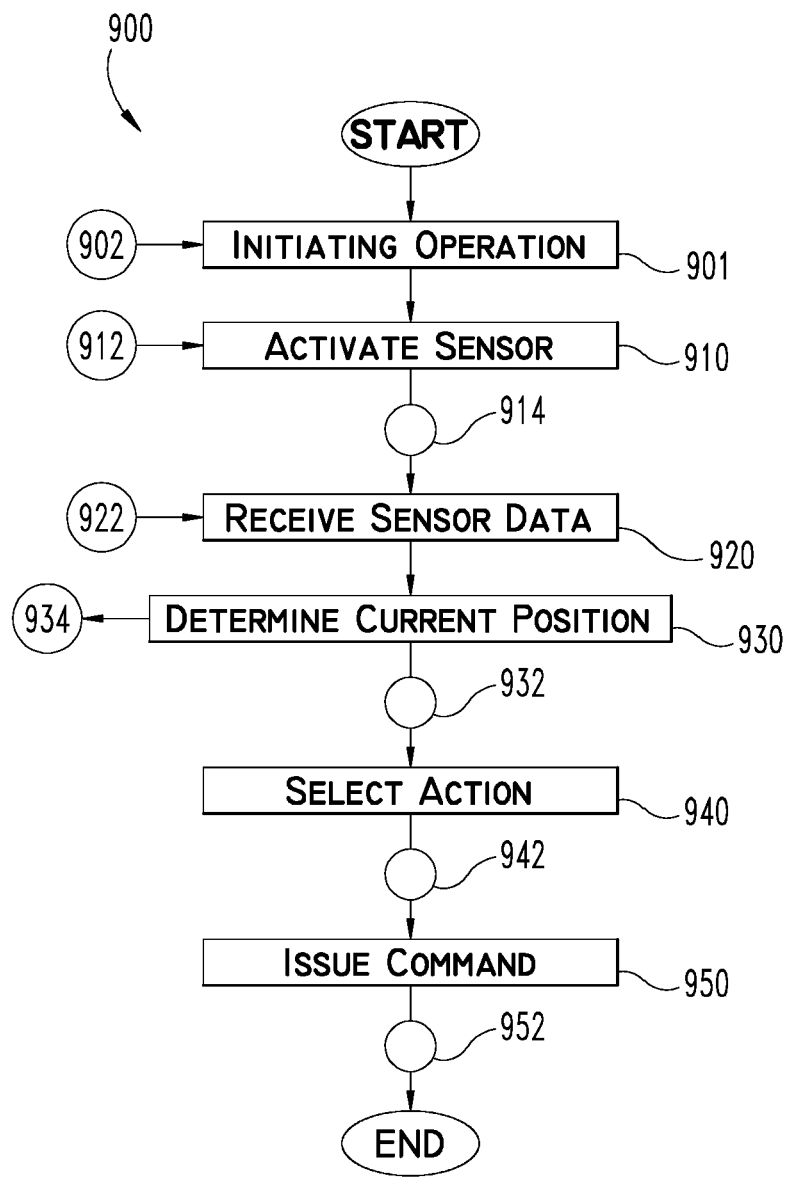
FIG. 16 is a schematic flow diagram of a process according to one embodiment.

With reference to FIG. 16, an exemplary process 900 which may be performed using the door operator 100 is illustrated therein. Operations illustrated for the processes in the present application are understood to be examples only, and operations may be combined or divided, and added or removed, as well as re-ordered in whole or in part, unless explicitly stated to the contrary. Unless specified to the contrary, it is contemplated that certain operations or steps performed in the process 900 may be performed wholly by the controller 140 or external system 160, or that the operations or steps may be distributed among one or more of the elements and/or additional devices or systems which are not specifically illustrated in the Figures.

FIG. 16 illustrates a schematic flow diagram of the exemplary process 900, which may begin with an initiating operation 901. The initiating operation 901 may, for example, include receiving an initiating signal 902. In certain forms, the initiating signal 902 may be received from the inductive sensor 130 or another sensor associated with the door operator 100 and/or closure assembly 70. For example, the initiating signal 902 may indicate that a user is approaching the door 74 or has begun to manually open the door 74. In other forms, the initiating signal 902 may be received from the external system 160. For example, the initiating signal 902 may be a command to begin a door-opening operation.

The process 900 includes a sensor activating operation 910, which includes activating the sensor 130. For example, the operation 910 may include supplying a varying power signal such as AC power 912 to the inductor 132, thereby causing the inductor 132 to generate the magnetic field 133. When activated, the sensor 130 generates an output signal 914 corresponding to a variable characteristic of the inductor 132, such as the inductance or impedance. For example, the converter 136 may generate the output signal 914 with a value corresponding to the inductance of the inductor 132. The operation 910 may further include inductively linking the inductor 132 to the target 103, thereby generating the eddy currents 105 on the target 103. As a result of the inductive link, the output signal 914 varies in response to movement of the target 103. The operation 910 may, for example, be performed by the sensor activating unit 141.

The process 900 may proceed to a data receiving operation 920, which includes receiving sensor data 922 from the sensor 130. For example, the sensor data 922 may include the output signal 914. In certain embodiments, the operation 920 may be performed with the sensor receiving unit 142. After receiving the sensor data 922, the process 900 may continue to a position determining operation 930.

The operation 930 includes determining a current position 932 based upon the sensor data 922. The current position 932 may include a door position 80 and/or an arm position 180. The operation 930 may, for example, include comparing the sensor data 922 to a position data look-up table 148 stored in the memory 146. The operation 930 may further include storing the sensor data 922 and/or the current position 932 in the memory 146 as position data 934. The position data 934 may also include information relating to the direction of door movement, which may be obtained by comparing the current sensor data 922 to previous values of the sensor data 922. In certain embodiments, the operation 930 may be performed with the door position unit 143.

The process 900 may continue to an action selecting operation 940 which includes selecting one or more actions 942 based upon the current position 932 and/or the position data 934. The operation 940 may, for example, include comparing the position data 932 to a commands look-up table 148 stored in memory 146. The operation 940 may be further based upon the direction in which the door 74 is currently moving. For example, the selected action 942 may be a backcheck action when the door 74 is in the backcheck range 85 and the arm 122 is rotating in the door-opening direction 192. As another example, the selected action 942 may be a latching action when the door 74 is in the latching range 89 and the arm 122 is rotating in the door-closing direction 196. In certain embodiments, the operation 940 may be performed with the action selecting unit 144.

The process 900 may then continue to a commands issuing operation 950, which includes issuing a command 952 corresponding to the selected action 942. For example, the operation 950 may include issuing the command 952 to the actuating mechanism 150, thereby causing the actuating mechanism 150 to perform the selected action 942 to regulate or control the rotational speed of the pinion 112. In certain embodiments, the operation 950 may be performed with the commands issuing unit 145. The process 900 may then be repeated.

Figure 17:
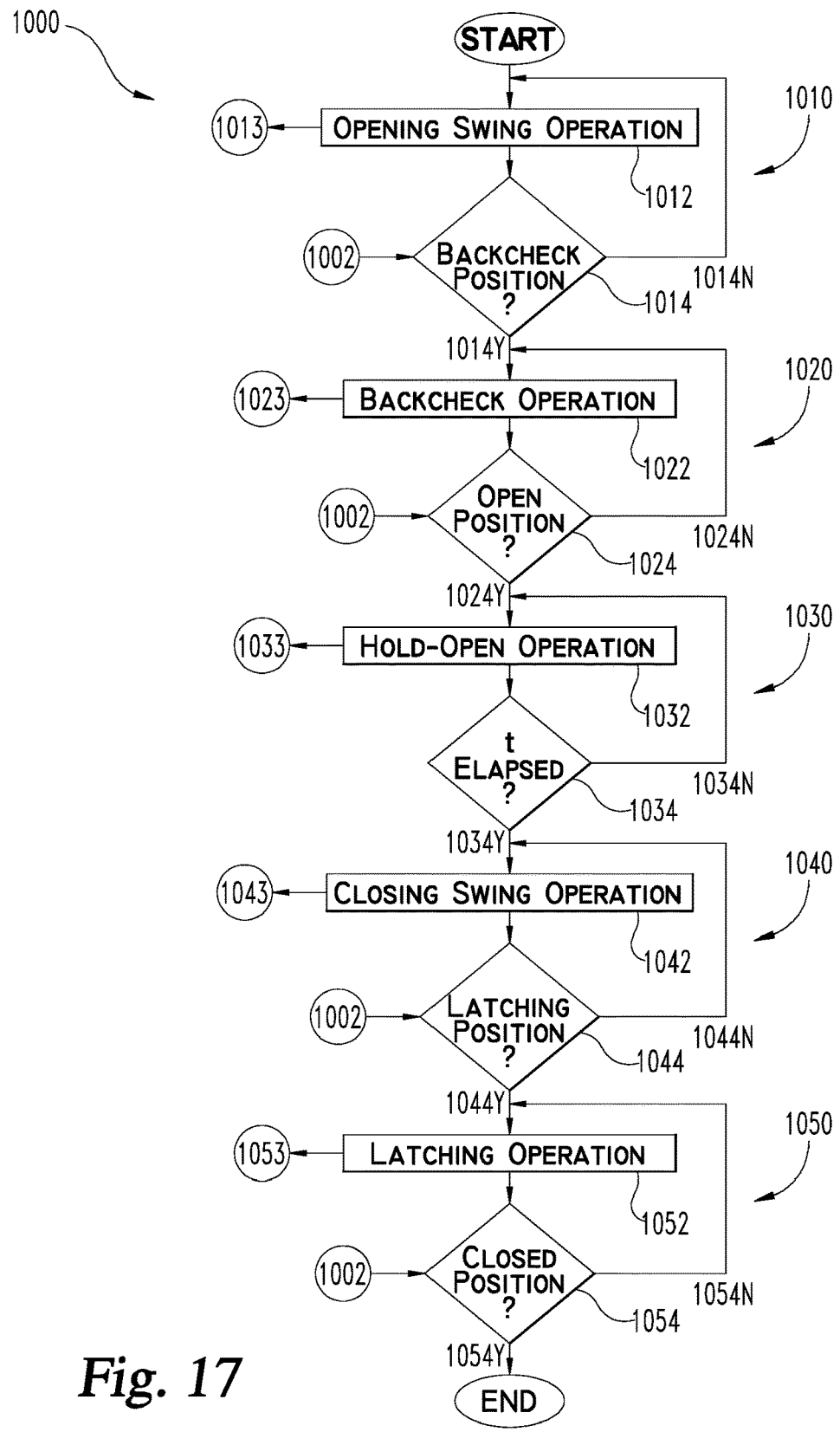
FIG. 17 is a schematic flow diagram of a process according to another embodiment.

With reference to FIG. 17, illustrated therein is a second exemplary process 1000 which may be performed using the door operator 100. The exemplary process 1000 illustrates one form of the above described process 500 which may be performed during a full open/close motion 91 of the door 74.

The process 1000 may begin with an opening swing procedure 1010, which includes an opening swing operation 1012. For example, the operation 1012 may include performing the process 900 to activate the sensor 130 in the operation 910, receive data from the sensor 130 in the operation 920, determine the opening swing motion 93 in the operation 930, select an opening swing action in the operation 940, and issue an opening swing command to the actuating device 150 in the operation 950.

As indicated above, the operation 1012 may include performing the process 900 to receive sensor data, determine the position and/or motion of the door, and determine and issue commands based upon the position/motion data. It is to be understood that the various operations and procedures described hereinafter may also include performing the process 900 to receive sensor data, determine a current position, select an action based upon the current position, and issue a command corresponding to the selected action.

The opening swing operation 1012 may further include performing an opening swing action 1013. In certain circumstances, it may be desirable for the door 74 to pass through the opening swing range 83 with relatively little resistance. As such, the opening swing action 1013 may include actuating the actuating mechanism 150 to reduce the resistance provided by the operator 100, or to actively urge the door 74 toward the open position 86.

The opening swing procedure 1010 further includes a conditional operation 1014, which includes determining whether the door 74 has reached the backcheck position 84 based on current position data 1002. If the door 74 has not yet reached the backcheck position 84 (1014N), the process 1000 may return to the opening swing operation 1012. In other words, the opening swing procedure 1010 may be performed while the door 74 is in the opening swing range 83, or until the door 74 completes the opening swing movement 93. When the door 74 reaches the backcheck position 84 (1014Y), the process 1000 may continue to a backcheck procedure 1020.

The backcheck procedure 1020 includes a backcheck operation 1022 which may include performing a backcheck action 1023. The backcheck procedure 1020 also includes a conditional operation 1024, which includes determining whether the door 74 has reached the open position 86. If the door 74 has not yet reached the open position 86 (1024N), the process 1000 may return to the backcheck operation 1022. In other words, the backcheck procedure 1020 may be performed while the door 74 is in the backcheck range 85, or until the door 74 completes the backcheck movement 95. When the door 74 reaches the open position 86 (1024Y), the process 1000 may continue to a hold-open procedure 1030.

The hold-open procedure 1030 includes a hold-open operation 1032 which may include performing a hold-open action 1033 to retain the door 74 in the open position 86. The hold-open procedure 1030 may include performing the hold-open operation 1032 for a predetermined amount of time, as indicated by the conditional 1034. Once the hold-open procedure 1030 is complete, the door 74 will enter the closing motion 96, for example under the force of a spring such as the springs 116, 116.

When the door 74 begins the closing swing motion 97, the process 1000 may continue to a closing swing procedure 1040. The closing swing procedure 1040 includes a closing swing operation 1042 which may include performing a closing swing action 1043. The closing swing procedure 1040 also includes a conditional operation 1044, which includes determining whether the door 74 has reached the latching position 88. If the door 74 has not yet reached the latching position 88 (1044N), the process 1000 may return to the closing swing operation 1042. In other words, the closing swing procedure 1040 may be performed while the door 74 is in the closing swing range 87, or until the door 74 completes the closing swing movement 97. When the door 74 reaches the latching position 88 (1044Y), the process 1000 may continue to a latching procedure 1050.

The latching procedure 1050 includes a latching operation 1052 which may include performing a latching action 1053. The latching procedure 1050 also includes a conditional operation 1054 which includes determining whether the door 74 has reached the closed position 82. If the door 74 has not yet reached the closed position 82 (1054N), the process 1000 may return to the latching operation 1052. In other words, the latching procedure 1050 may be performed while the door 74 is in the latching range 89, or until the door 74 completes the latching movement 99. When the door 74 reaches the closed position 82 (1054Y), the process 1000 may be complete.

It is to be understood that the process 1000 has been described with respect to the full open/close motion 91 in which the door 74 completes the entire opening motion 92 and the entire closing motion 96. As will be appreciated, one or more of the procedures 1010-1050 may include further conditionals to account for abortive opening and/or closing motions 92, 96. For example, the opening swing procedure 1010 may include a conditional to determine whether the door 74 has begun to move in the closing direction prior to reaching the backcheck position 84. When such an abortive opening swing movement 93 is determined, the process 1000 may proceed directly from the opening swing procedure 1010 to the closing swing procedure 1040 or the latching procedure 1050, depending upon the position of the door 74. Similarly, the closing swing procedure 1040 may include a conditional to determine if the door 74 has begun to move in the opening direction prior to reaching the latching position 88. When such an abortive closing swing movement 97 is determined, the process 1000 may return to the opening swing procedure 1010 or the backcheck procedure 1020, depending upon the position of the door 74

In certain forms, the process 1000 may be performed using a door actuator. For example, when performed with the door actuator 200 illustrated in FIG. 3, one or more of the above-described procedures, operations, and actions may take the following form.

The opening swing operation 1012 may include issuing an opening swing command to the motor 252, and the opening swing action 1013 may include driving the motor 252 in response to the command. The motor 252 may be driven in a direction which urges the pinion 112 in the door-opening direction 192, thereby providing a power assist or power open function. In certain embodiments, the door 74 may be manually moved through the opening swing motion 93 such that rotation of the pinion 112 drives the motor shaft 259. In such forms, the opening swing action 1013 may include causing the motor 252 to generate electrical power as the motor shaft 259 is rotated, and may further include storing the electrical energy for later use.

The backcheck operation 1022 may include issuing a backcheck command to the motor 252, and the backcheck action 1023 may include driving the motor 252 in response to the backcheck command. The motor 252 may be driven in the same direction as in the opening swing action 1013, but at a lower speed. As a result, the door 74 may have a lower speed during the backcheck motion 95 than during the opening swing motion 93, thereby reducing the risk of damage to the door 74 or adjacent structures. Additionally or alternatively, the backcheck action 1023 may include increasing the resistance applied to the pinion 112 by the motor 252, thereby slowing the door in the backcheck range 85.

The hold-open operation 1032 may include issuing a hold-open command to the motor 252, and the hold-open action 1033 may include retaining the rotational position of the motor shaft 259 in response to the hold-open command. As a result, the rotational position of the pinion 112 is maintained, and the door 74 is retained in the open position 86.

The closing swing operation 1042 may include issuing a close command to the motor 252, and the closing swing action 1043 may include allowing the motor 252 to rotate at a predetermined speed in response to the closing swing command. Thus, the pinion 112 will rotate at a corresponding speed as the spring 116 urges the rack 214 toward the motor 252. In certain forms, the closing swing action 1043 may include driving the motor to rotate the pinion 112 in the door-closing direction 196, and the spring 116 may be omitted. In either event the closing swing action 1043 may include controlling or regulating the speed of the door 74 during the closing swing motion 97.

The latching operation 1052 may include issuing a latching command to the motor 252, and the latching action 1053 may include operating the motor 252 in response to the latching command. In certain embodiments, the latching action 1053 may include allowing the motor 252 to rotate at a greater speed than is allowed during the closing swing action 1043, thereby allowing the door 74 to move at a speed sufficient to ensure that the door 74 reaches the closed position 82. In other embodiments, the latching action 1053 may include actively driving the motor 252 in a direction that urges the pinion 112 in the door-closing direction 196, thereby actively urging the door 74 to the closed position 82.

In certain forms, the process 1000 may be performed using a door closer. For example, when performed with the door closer 300 illustrated in FIG. 4, one or more of the above-described procedures, operations, and actions may take the following form.

The opening swing operation 1012 may include issuing an opening swing command to the valve 352, and the opening swing action 1013 may include setting the valve 352 to a first position in response to the opening swing command. The first position may, for example, be a fully open position of the valve 352. As a result, the hydraulic fluid 354 is free to move between the chambers 356, 358, and the hydraulic assembly 350 provides relatively little resistance to the door 74 during the opening swing motion 93.

The backcheck operation 1022 may include issuing a backcheck command to the valve 352, and the backcheck action 1023 may include setting the valve 352 in a second position in response to the backcheck command. The second position may, for example, be a partially closed position of the valve 352, such that flow of the hydraulic fluid 354 between the chambers 356, 358 is inhibited. As a result, the hydraulic assembly 350 provides a greater resistance to the door 74 during the backcheck motion 95, thereby reducing the risk of damage to the door 74 or adjacent structures.

The hold-open operation 1032 may include issuing a hold-open command to the valve 352, and the hold-open action 1033 may include setting the valve 352 to a third position in response to the hold-open command. The third position may be a fully closed position of the valve 352 such that the hydraulic fluid 354 is prevented from flowing from the second chamber 358 to the first chamber 356. As a result, the hydraulic assembly 350 prevents linear movement of the rack 314. The rack 314 therefore maintains the rotational position of the pinion 112, and the door 74 is retained in the open position 86.

The closing swing operation 1042 may include issuing a closing swing command to the valve 352, and the closing swing action 1043 may include setting the valve 352 to a fourth position in response to the closing swing command. The fourth position may, for example, be a partially closed position of the valve 352 such that flow of the hydraulic fluid 354 between the chambers 356, 358 is hindered. As a result, the hydraulic system 350 opposes the biasing force of the spring 116 and regulates the speed of the door 74 during the closing swing motion 97.

The latching operation 1052 may include issuing a latching command to the valve 352, and the latching action 1053 may include setting the valve 352 to a fifth position in response to the latching command. The fifth position may, for example, be a fully open position of the valve 352 such that the hydraulic assembly 350 provides relatively little opposition to the biasing force of the spring 116. As a result, the spring 116 may cause the door 74 to travel at a speed sufficient to ensure that the door 74 reaches the closed position 82.

Figure 18:
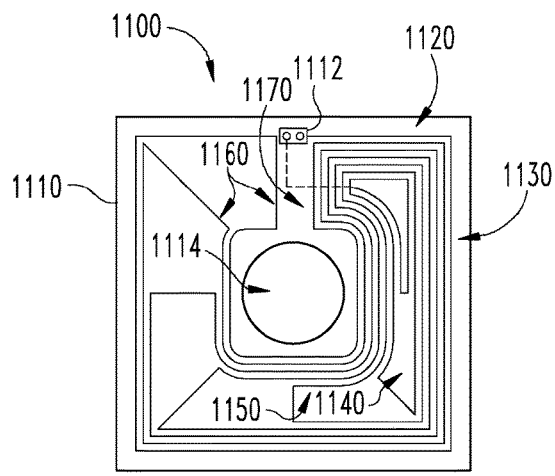
FIGS. 18-20 illustrate inductive rotational position sensors according to further embodiments.
Figure 19:
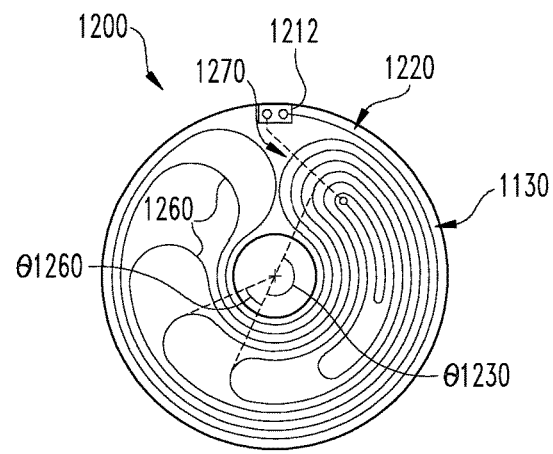
Figure 20:
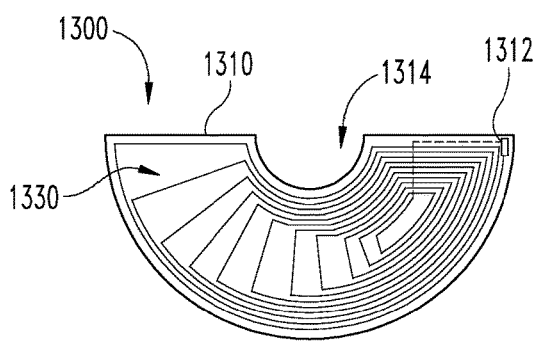

FIGS. 18-20 depict inductive rotational position sensors 1100, 1200, 1300 according to other embodiments. Each of the sensors 1100, 1200, 1300 is substantially similar to the inductive rotational sensors 400, 600 described above. Unless indicated otherwise, similar reference characters are used to indicate similar elements and features. In the interest of conciseness, the following descriptions focus primarily on features that are different than those described above with regard to the above-described sensors.

FIG. 18 illustrates a sensor 1100 including a plurality of nested coils 1130, each of which includes an outer segment 1140 and an inner segment 1150. While the outer and inner segments 1140, 1150 include rectilinear portions, they may nonetheless be considered to curve about the opening 1114.

FIG. 19 illustrates a sensor 1200 including a curvilinear trace 1220. More specifically, the end segments 1260 and connector segments 1270 define arcuate paths. In certain forms, the angular offset between the end segments 1260 may be the angle θ1260 defined by the leading edges of the end segments 1260. Similarly, the subtended angle θ1230 of each of the coils 1230 may be defined by the one of the end segments 1260 and one of the connector segments 1270.

FIG. 20 illustrates a sensor 1300 formed on a semicircular PCB 1310. The PCB has a semi-circular opening 1314 configured to partially receive a portion of the hub 121 and/or the pinion 112, and the coils 1330 are curved about the opening 1314.

As noted above, while FIG. 10 illustrates a direct correlation between the inductance 480 and the door position 80, it is also contemplated that the inductance 480 may be indicative of the arm position 180, which in turn correlates to the door position 80. As will be appreciated, the correlation between arm position 180 and door position 80 may depend upon a number of factors, such as the configuration of the door operator 100. In certain forms, a single operator body 110 may be configured for use with different configurations of arm assembly 120, for example to alter the angular span of the opening movement 91 (i.e. the angle between the door closed position 82 and the door open position 86) or to allow the operator body 110 to be mounted on a different element of the closure assembly 70. In such forms, the different configurations of the operator 100 may result in different values of the door angle (i.e. the angular position of the door 74 with respect to the closed position 82) for some of the door positions 80. Furthermore, due to the differing configurations of the arm assemblies 120, the same door angle may correspond to different arm positions 180.

Figure 21:
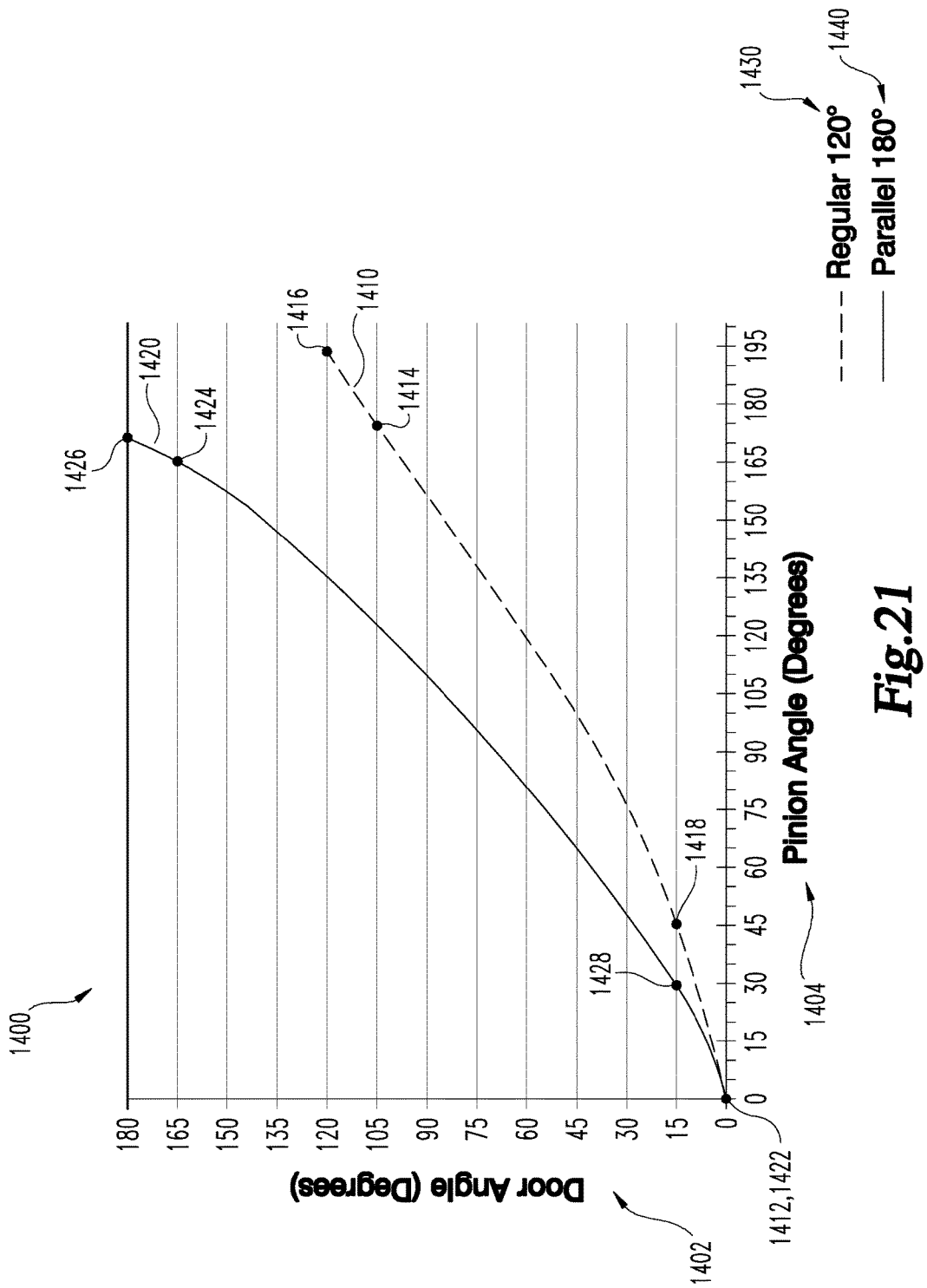
FIG. 21 is a graph illustrating relationships between door angles and pinion angles for two exemplary forms of door operator.
Figure 22:
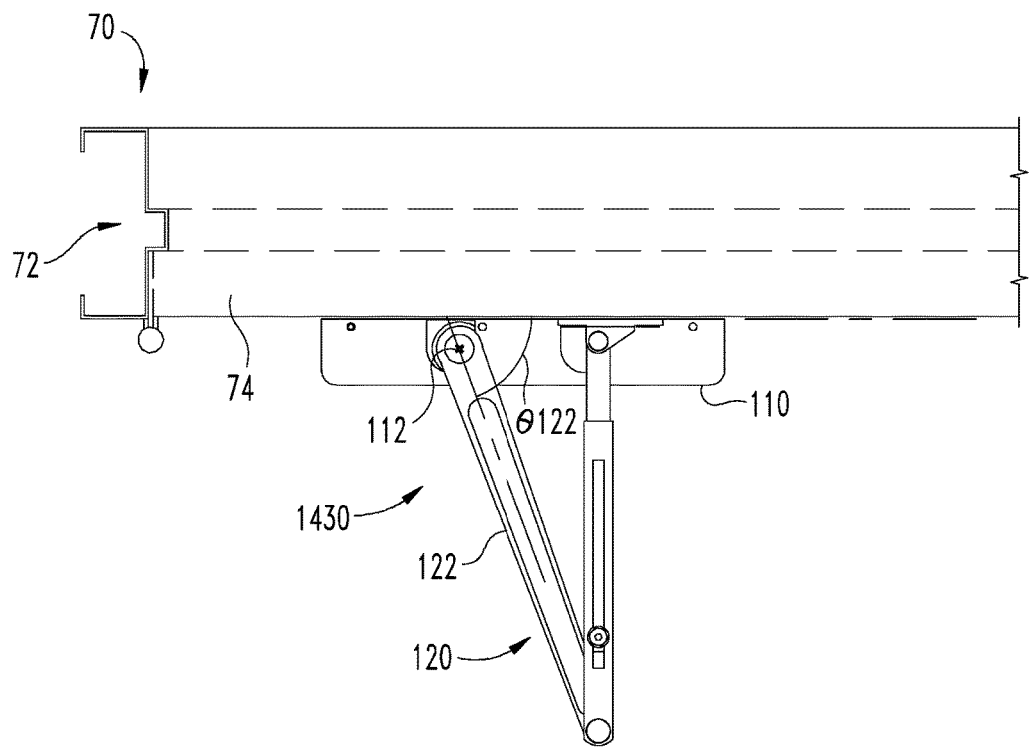
FIGS. 22 and 23 illustrate the two exemplary forms of door operator corresponding to the relationships illustrated in the graph of FIG. 21.
Figure 23:
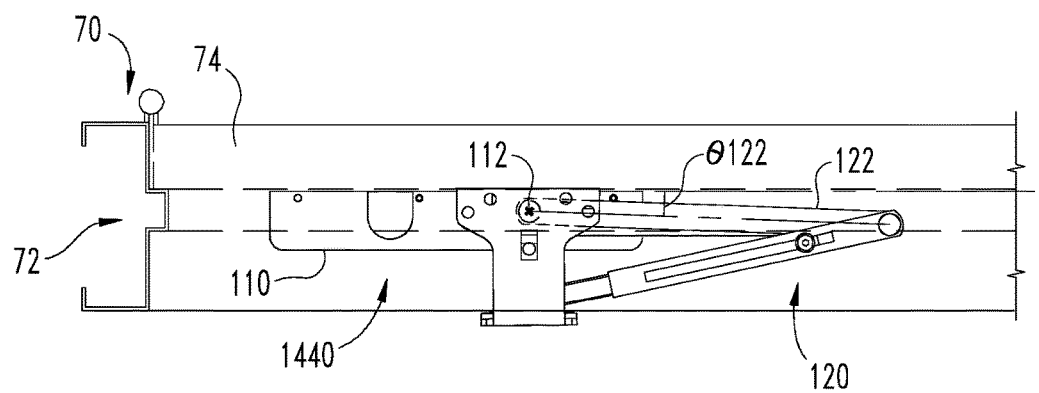

With reference to FIG. 21, illustrated therein is a graph 1400 depicting two exemplary relationships 1410, 1420 between door angles 1402 and pinion angles 1404 for two exemplary forms of door operator 1430, 1440, which are illustrated in FIGS. 22 and 23. Due to the fact that the target arm 122 is coupled with the pinion 112 in each of the operators 1430, 1440, the pinion angle 1404 may alternatively be referred to as the arm angle 1404. In the illustrated form, the operators 1430, 1440 include the same operator body 110 and different forms of the arm assembly 120. More specifically, the first door operator 1430 includes a "standard" form of arm assembly 120, and the second door operator 1440 includes a "parallel" form of arm assembly 120. As a result of the different forms of arm assembly 120, the target arms 122 of the door operators 1430, 1440 define different orientation angles θ122 with respect to a common reference plane when the door 74 is in the closed position 82. The common reference plane may, for example, be a plane which is defined through the pinion 112 and is parallel to a door-abutting surface of the operator body 110. These differing angles θ122 may be accounted for by installing the sensor 130 with the alignment region 137 aligned with the closed position 182 of the arm 122, such that the closed position 182 of the arm 122 defines a pinion angle 1404 of 0°.

In the illustrated form, the "standard" form of arm assembly 120 provides the first operator 1430 with an opening angle of about 120°, and the "parallel" form of arm assembly 120 provides the second operator 1440 with an opening angle of about 180°. In other words, the open position 86 of the first operator 1430 corresponds to a door angle 1402 of 120°, and the open position 86 of the second operator 1440 corresponds to a door angle 1402 of 180°. While other values are contemplated, in the illustrated form, the backcheck range 85 and latching range 89 for each of the operators 1430, 1440 is set to 15°. Thus, the backcheck position 84 of first door operator 1430 corresponds to a door angle 1402 of 105°, the backcheck position 84 of the second door operator 1440 corresponds to a door angle 1402 of 165°, and the latching positions 88 of each of the door operators 1430, 1440 corresponds to a door angle 1402 of 15°. It is to be understood that the relationships 1410, 1420 between door angle 1402 and pinion angle 1404 set forth in FIG. 21 are intended to be illustrative only, and that alternative configurations of door operator may result in the door positions 80 corresponding to different values of door angle 1402 and/or pinion angle 1404.

Each of the door angles 1402 has a corresponding arm angle 1404 in each of the operators 1430, 1440. In FIG. 21, data points corresponding to one of the relationships 1410, 1420 and one of the door positions 80 are indicated with similar reference characters. For example, the data point 1418 corresponds to the first operator relationship 1410 and the latching position 88, and may therefore be referred to as a first operator latching position datum 1418. The first operator latching position datum 1418 indicates that when the first operator 1430 is utilized and the door 74 is in the latching position 88, the door angle 1402 is about 15° and the arm angle 1404 is about 45°. The door angle 1402 and arm angle 1404 corresponding to the first operator latching position datum 1418 may alternatively be referred to as the first operator latching position door angle $1418_{door}$ and the first operator latching position arm angle $1418_{arm}$. As another example, the second operator open position datum 1426 indicates that when the second operator 1440 is utilized and the door 74 is in the open position 86, the door angle 1402 is about 180° and the arm angle 1404 is about 170°. In other words, the second operator open position door angle $1426_{door}$ is about 180°, and the second operator open position arm angle $1426_{arm}$ is about 170°.

As a result of the different forms of arm assemblies 120 utilized in the operators 1430, 1440, the arm or pinion angle 1404 at each of the door positions 80 may be different for the operators 1430, 1440. For example, while the latching position 88 for each of the operators 1430, 1440 corresponds to a door angle 1402 of 15°, the first operator latching position arm angle $1418_{arm}$ is about 45°, while the second operator latching position arm angle $1428_{arm}$ is about 30°. When the methods and sensors described herein are intended to be used with operators 100 of varying configurations, it may be desirable to account for the different correlations between door position 80, door angle 1402, and pinion angle 1404 that result from the different configurations of operator 100.

In certain forms, the different correlations may be accounted for by the firmware, programs, data, and/or instructions associated with the controller 140. In such forms, the same inductive sensor may be utilized in each of a plurality of operator configurations, such as the operators 1430, 1440. For example, the memory 146 may include a first look-up table 148 corresponding to the first operator 1430 and a second look-up table 148 corresponding to the second operator 1440. Each of the look-up tables 148 may include information correlating the inductance of the sensor 130 with the corresponding door positions 80, such as information corresponding to the relationships 1410, 1420 illustrated in FIG. 21. For example, the first look-up table 148 may include information indicating that the door 74 is in the latching position 88 when the inductance of the sensor 130 corresponds to a pinion angle 1404 of about 45°, and the second look-up table 148 may include information indicating that the door 74 is in the latching position 88 when the inductance of the sensor 130 corresponds to a pinion angle 1404 of about 30°. Selection of the look-up table 148 to be utilized may be accomplished, for example, using a physical input such as a DIP switch, or an electronic input such as a command from the access control system 162. In other forms, an installation procedure may include storing the look-up table 148 corresponding to the selected configuration, such that the controller 140 has access to only the correct look-up table.

In the embodiments described immediately above, the inductance corresponding to each of the door positions 80 varies according to the configuration of the operator 100 on which the sensor 130 is installed. As a result, the controller 142 may require information relating to the selected configuration in order to ensure that the correct door position 80 is determined. It is also contemplated that the controller 140 may be "agnostic" or "ignorant" as to the configuration of the operator 100, and that the different correlations between door position 80 and pinion angle 1404 may be accounted for by the hardware of the sensor 130 itself.

Figure 24:
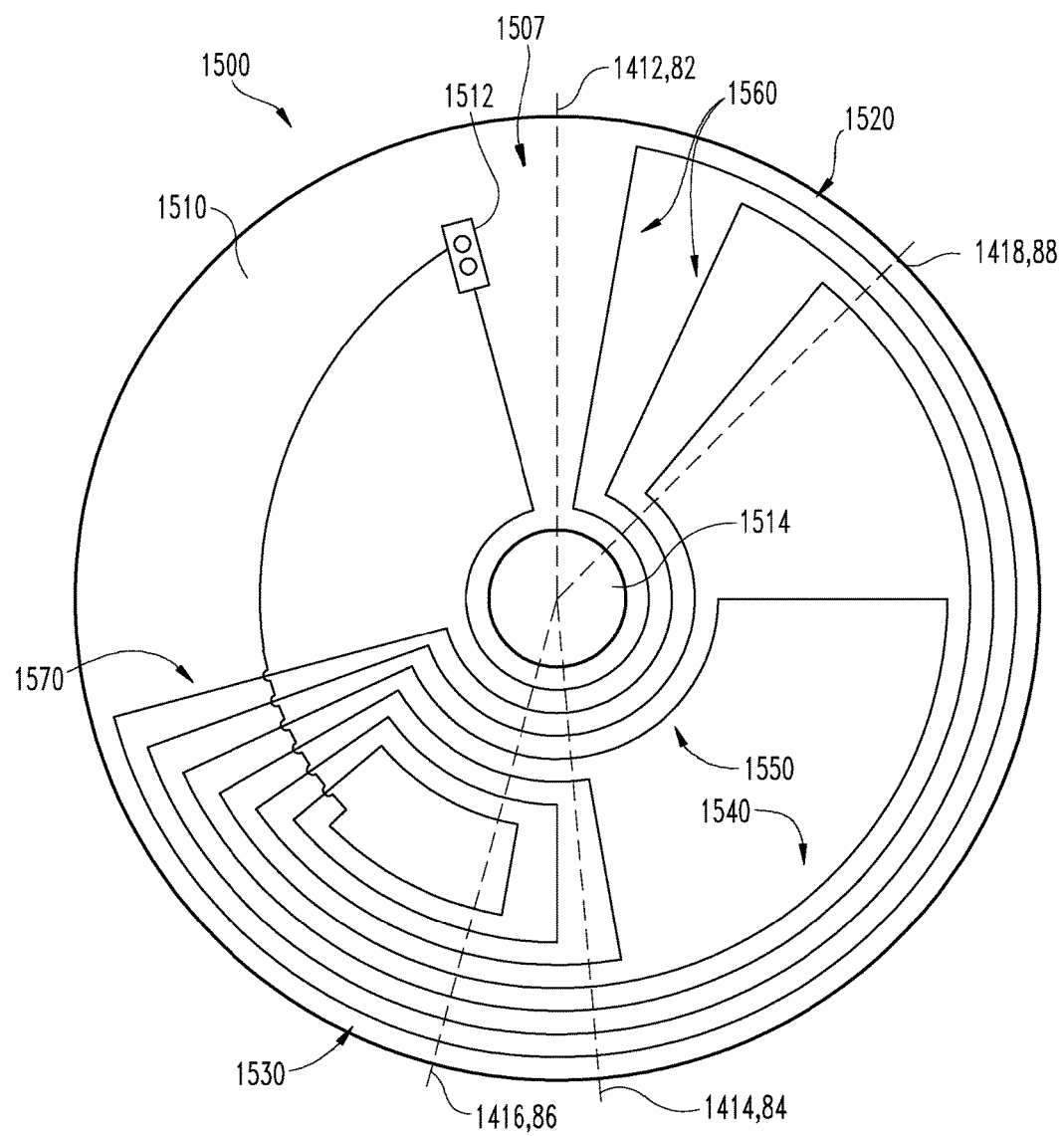
FIGS. 24-26 illustrate inductive rotational position sensors according to further embodiments.
Figure 25:
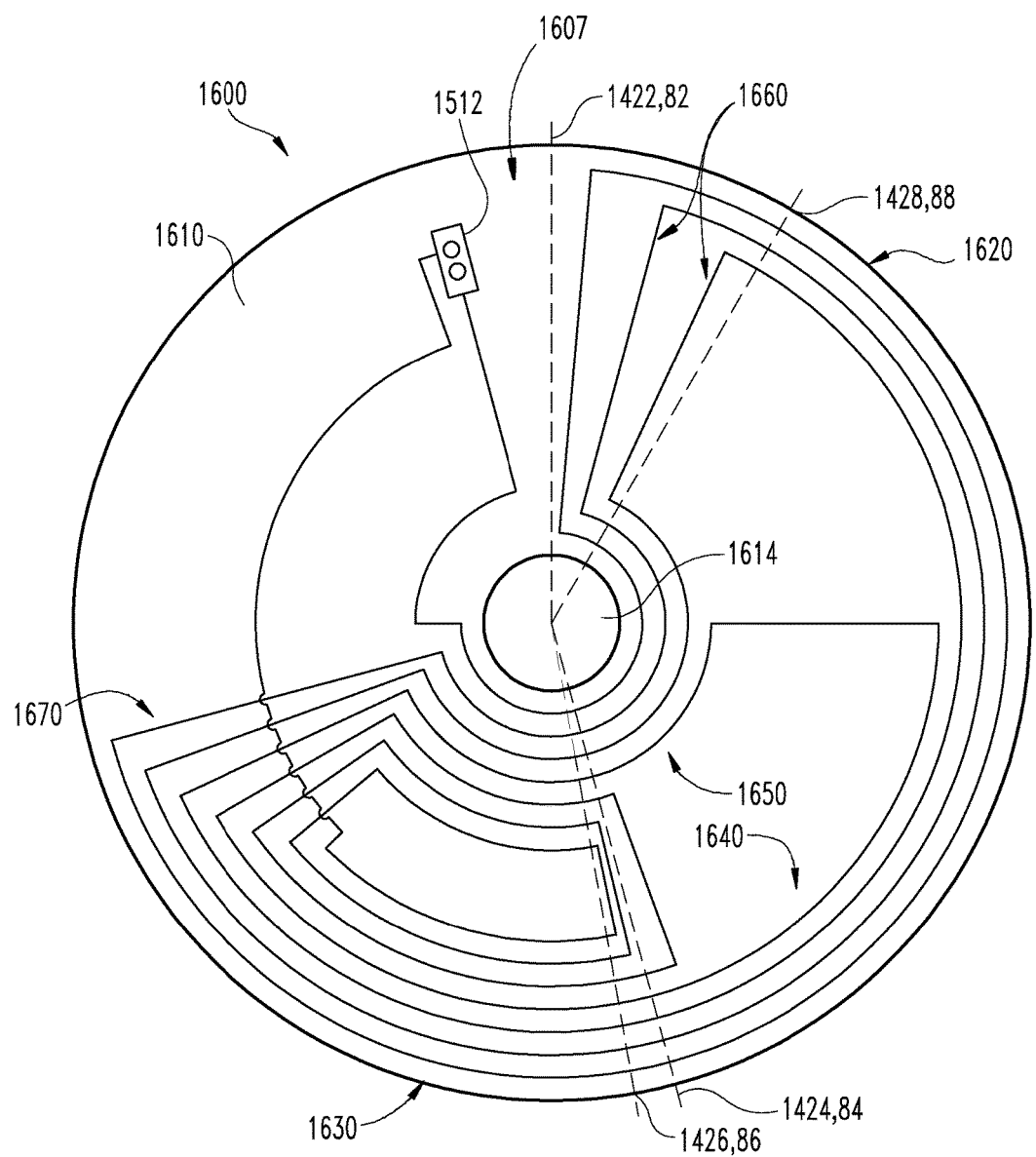

With additional reference to FIGS. 24 and 25, in one embodiment, a different sensor 130 may be provided for each of the potential configurations of the operator 100. For example, a first inductive sensor 1500 may be installed in the first operator configuration 1410, and a second inductive sensor 1600 may be installed in the second operator configuration 1420. In the sensor 400 described above, the end segments 460 define "ends" of the coils 430, such that the arm 122 "exits" the coils 430 as the arm 122 rotates from the closed arm position 182 to the open arm position 186. In contrast, the end segments 1560, 1660 of the illustrated sensors 1500, 1600 define "beginnings" of the coils 1530, 1630, such that the arm 122 "enters" the coils 1530, 1630 as the arm 122 rotates from the closed arm position 182 to the open arm position 186. Thus, while the inductance of the sensor 400 generally decreases as the door 74 moves from the closed position 82 to the open position 86, the inductances of the sensors 1500, 1600 generally increase as the door 74 moves from the closed position 82 to the open position 86.

The coils 1530, 1630 in the first and second sensors 1500, 1600 may be sized and spaced such that the inductance of the sensors 1500, 1600 is substantially equal at selected door positions 80. For example, the number of end segments 1560 in the first 45° of the first sensor 1500 may be equal to the number of end segments 1660 in the first 30° of the second sensor 1600. In such forms, the number of coils 1530 in the first sensor 1500 that are overlapped by the first operator 1430 target arm 122 when in the 45° position (corresponding to the first operator latching position arm angle $1418_{arm}$) is equal to the number of coils 1630 in the second sensor 1600 that are overlapped by the second operator 1440 target arm 122 when in the 30° position (corresponding to the second operator latching arm angle $1428_{arm}$). As a result, a single inductance value may be indicative of the latching position 88 regardless of the configuration of the operator 100. As will be appreciated, similar techniques may be utilized to ensure that the outputs of the sensors are equal for other door positions 80, such as the backcheck position 84 and the door open position 86.

In the first sensor 1500, the end segments 1560 of the three outermost coils 1530 are offset from one another by 15° such that the three outermost coils 1530 "begin" between the first operator closed position arm angle $1412_{arm}$ of 0° and the first operator latching position arm angle $1418_{arm}$ of 45°. Additionally, two end segments 1560 are positioned between the first operator latching position arm angle $1418_{arm}$ of 45° and the first operator backcheck position arm angle $1414_{arm}$ of 175°, and two further end segments 1560 are positioned between the first operator backcheck position arm angle $1414_{arm}$ of 175° and the first operator open position arm angle $1416_{arm}$ of 195°. Thus, the target arm 122 of the first operator 1430 overlaps three coils 1530 when the door 74 is in the latching position 88, five coils 1530 when the door 74 is in the backcheck position 84, and seven coils 1530 when the door 74 is in the open position 86.

In the second sensor 1600, the end segments 1660 of the three outermost coils 1630 are offset from one another by 10° such that the three outermost coils 1630 "begin" between the second operator closed position arm angle $1422_{arm}$ of 0° and the second operator latching position arm angle $1428_{arm}$ of 30°. Additionally, two end segments 1660 are positioned between the second operator latching position arm angle $1428_{arm}$ of 30° and the second operator backcheck position arm angle $1424_{arm}$ of 165°, and two further end segments 1660 are positioned between the second operator backcheck position arm angle $1424_{arm}$ of 165° and the second operator open position arm angle $1426_{arm}$ of 170°. Thus, the target arm 122 of the second operator 1440 overlaps three coils 1630 when the door 74 is in the latching position 88, five coils 1630 when the door 74 is in the backcheck position 84, and seven coils 1630 when the door 74 is in the open position 86.

As is evident from the foregoing, the number of coils in the sensors 1500, 1600 that are overlapped by the target arm 122 of the corresponding operator 1430, 1440 is equal at each of the door positions 80 of interest. Thus, the inductance values of the two sensors 1500, 1600 are equal to one another at each of these door positions 80, despite the fact that the door angles 1402 and arm angles 1404 of the operators 1430, 1440 are not necessarily equal at these door positions 80. Additionally, the coils 1530, 1630 may be sized and spaced such that the sensors 1500, 1600 generate the same inductance profile (such as the inductance profile illustrated in FIG. 10 or that illustrated in FIG. 12) during the full opening/closing motion 91. In such forms, the controller 140 may be "ignorant" or "agnostic" to the configuration of the operator, and may therefore be programmed with a single set of data relating inductance values to door positions. For example, the memory 146 may include a configuration-independent look-up table 148 including information correlating values of the output signal from the converter 136 to door positions 80.

In the embodiment described immediately above, the structure of each sensor 1500, 1600 is tailored to a single configuration of operator 1430, 1440. As a result, when the doors 74 associated with the operators 1430, 1440 are in the same door position 80 (which may correspond to different door angles 1402), the inductance values of the sensors 1500, 1600 are substantially equal to one another. It is also contemplated that a single sensor may be capable of generating configuration-independent inductance values. In other words, a single sensor may be structured to generate a consistent inductance profile during the full open/close motion 91 regardless of the configuration of the operator.

In one form, a single sensor may include a PCB having multiple layers, and each PCB layer may include a trace corresponding to a selected operator configuration. For example, the trace 1520 of the first sensor 1500 may be formed on a first PCB layer, and the trace 1620 of the second sensor 1600 may be formed on a second PCB layer. The controller 140 may be connected to first trace 1520 when the sensor is installed in the first operator 1430, and may be connected to the second trace 1620 when the sensor is installed in the second operator 1440. In certain embodiments, each of the traces 1520, 1620 may have a dedicated header. In other embodiments, the sensor may include a single header and a DIP switch which selectively connects the header to the first and second traces 1520, 1620. Furthermore, additional and/or alternative configurations of traces may be provided on additional PCB layers to enable selection between additional and/or alternative configurations of the operator.

Figure 26:
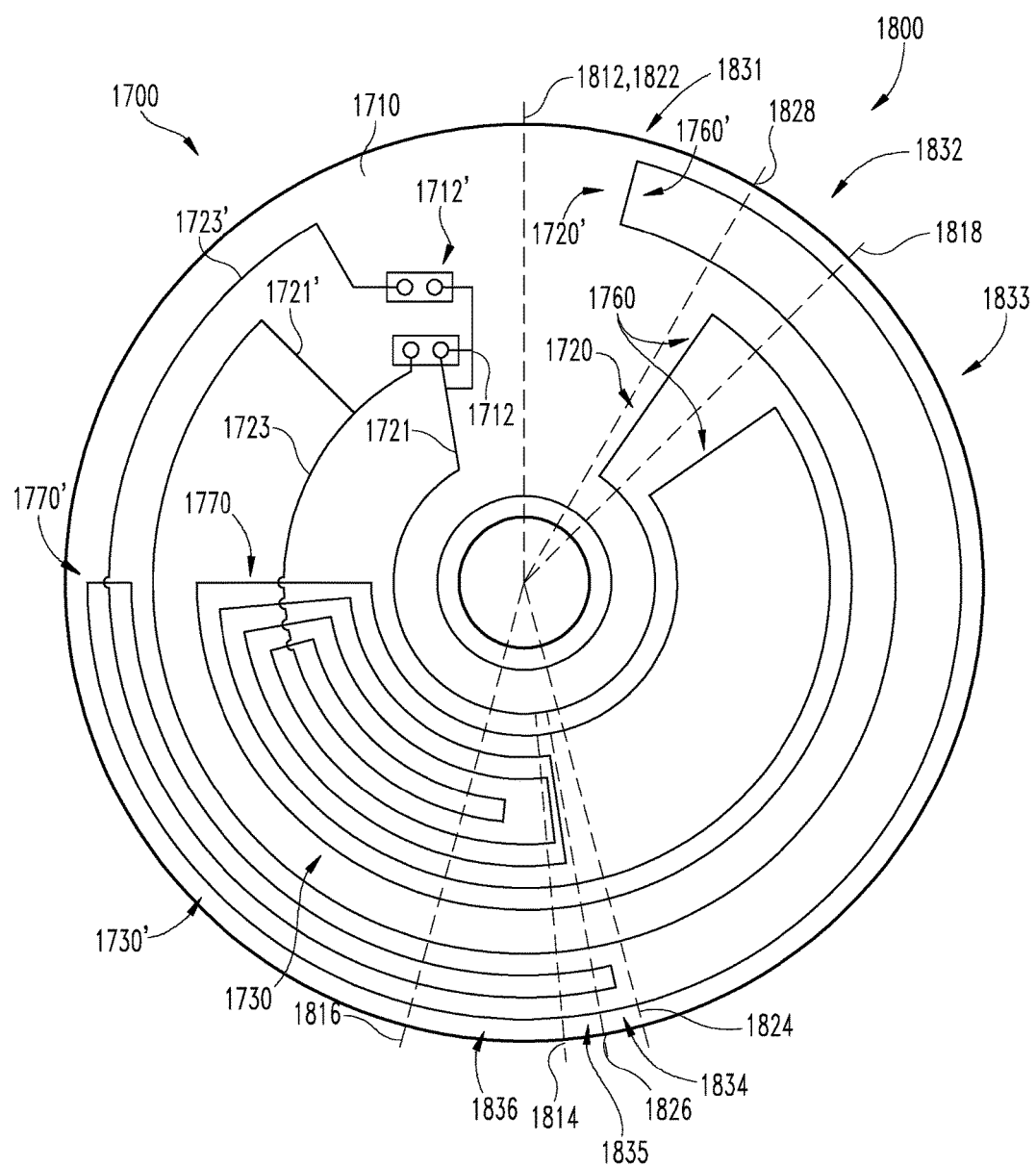

With additional reference to FIG. 26, another embodiment of a sensor 1700 includes a first trace 1720 having a first IN line 1721 and a first OUT line 1723, and a second trace 1720' having a second IN line 1721' and a second OUT line 1723'. The sensor 1700 also includes a first header 1712 connected to the first IN line 1721 and the first OUT line 1723, and a second header 1712' connected to the first IN line 1721 and the second OUT line 1723'. Additionally, the second IN line 1721 is connected to the first OUT line 1723. When the controller 140 is connected to the first header 1712, a circuit including the first trace 1720 is completed such that current can flow from the controller 140 through the first trace 1720. Due to the fact that the second OUT line 1723' is unconnected to the circuit, current will not flow through the second trace 1720'. Thus, when the controller 140 is connected to the first header 1712, the first trace 1720 is active, and the second trace 1720' is inactive. When the controller 140 is connected to the second header 1712', however, the controller 140 completes a circuit in which the first trace 1720 and the second trace 1720' are connected in series such that both of the traces 1720, 1720' are active.

The traces 1720, 1720' are structured such that the sensor 1700 is operable to generate configuration-independent inductance values or profiles when used with the operators 1430, 1440. FIG. 26 illustrates arm angles 1800 corresponding to the door positions 80 for each of the operators 1430, 1440, in which the arm angles 1800 are indicated with reference characters corresponding to the arm angles associated with the above-described data points. For example, the angular position 1828 corresponds to the second operator latching position arm angle 1428 arm, and may be referenced more concisely as the second latching angle 1828. Also illustrated in FIG. 24 is a plurality of angular regions 1830, each of which is defined between two arm angles 1800.

Each of the angular regions 1830 includes at least one of the first trace end segments 1760 and/or at least one of the second trace end segments 1760. A first region 1831 is defined between the closed angles 1812, 1822 (0°) and the second latching angle 1828 (30°), and includes a second trace end segment 1760'. A second region 1832 is defined between the second latching angle 1828 (30°) and the first latching angle 1828 (45°), and includes a first trace end segment 1760. A third region 1833 is defined between the first latching angle 1828 (45°) and the second backcheck angle 1824 (165°), and includes a first trace end segment 1760 and a second trace end segment 1760'. A fourth region 1834 is defined between the second backcheck angle 1824 (165°) and the second open angle 1826 (170°), and includes a second trace end segment 1760'. A fifth region 1835 is formed between the second open angle 1826 (170°) and the first backcheck angle 1814 (175°), and includes two first trace end segments 1760. A sixth region 1835 is formed between the first backcheck angle 1814 (175°) and the first open angle 1816 (195), and includes a first trace end segment 1760.

When the sensor 1700 is installed in the first operator 1430, the controller 140 may be connected to the first header 1712 such that only the first trace 1720 is active. As the door 74 passes through the full open/close motion 91, the target arm 122 rotates from the first closed angle 1812 to the first open angle 1816, and subsequently returns to the first closed angle 1812. As the target arm 122 rotates, it passes over the first trace end segments 1760 and the second trace end segments 1760', thereby overlapping the first trace coils 1730 and the second trace coils 1730'. Due to the fact that the second trace 1720' is inactive, however, the inductance of the sensor 1700 is not affected by the number of second trace coils 1730' overlapped by the target arm 122. The first trace end segments 1760 are positioned such that the target arm 122 overlaps one first trace coil 1730 at the first latching angle 1818, four first trace coils 1730 at the first backcheck angle 1814, and five first trace coils 1730 at the first open angle 1816.

When the sensor 1700 is installed in the second operator 1440, the controller 140 may be connected to the second header 1712' such that both the first trace 1720 and the second trace 1720' are active. As the door 74 passes through the full open/close motion 91, the target arm 122 rotates from the second closed angle 1822 to the second open angle 1826, and subsequently returns to the second closed angle 1822. Due to the fact that both the first trace 1720 and the second trace 1720' are active, the inductance of the sensor 1700 depends upon the total number of first trace coils 1730 and second trace coils 1730' overlapped by the target arm 122. The first and second trace end segments 1760, 1760' are positioned such that the target arm 122 overlaps none of the first trace coils 1730 and one of the second trace coils 1730' at the second latching angle 1828, two first trace coils 1730 and two second trace coil 1730' at the second backcheck angle 1824, and two first trace coils 1730 and three second trace coils 1730' at the second open angle 1826. Thus, the total number of coils 1730, 1730' overlapped by the target arm 122 is one at the second latching angle 1828, four at the second backcheck angle 1824, and five at the second open angle 1826.

As is evident from the foregoing, the number of active coils overlapped by the target arm 122 at each of the first operator arm angles 1810 is equal to the number of active coils overlapped by the target arm 122 at the corresponding one of the second operator arm angles 1820. As a result, the inductance of the sensor 1700 at each of the door positions 80 is independent of the configuration of the operator. For example, when a door 74 attached to the first operator 1430 is in the 105° door angle backcheck position 84, the target arm 122 is at the first backcheck angle 1814 and overlaps four active coils 1730 of the first trace 1720. When a door 74 attached to the second operator 1440 is in the 165° door angle backcheck position 84, the target arm 122 is at the second backcheck angle 1824 and overlaps four active coils, including two first trace coils 1730 and two second trace coils 1730'. Thus, the inductance of the sensor 1700, and therefore the output signal of the converter 136, is independent of the configuration of the operator.

While the illustrated sensor 1700 includes one active first trace 1720 and one selectively active second trace 1720', it is also contemplated that a sensor may include additional or alternative selectively active traces. For example, the sensor 1700 may further include a selectively active third trace which may be activated in combination with and/or instead of the illustrated second trace 1720'. It is further contemplated that the sensor 1700 may include a single header and a switch which selectively activates one or more of the selectively active traces. Additionally, while the traces 1720, 1720' are illustrated on a single layer of the PCB 1710, it is also contemplated that the traces 1720, 1720' may be formed on different PCB layers, and that one or more of the traces 1720, 1720' may be formed on multiple PCB layers.

One aspect of the present disclosure relates to a method of operating a door operator including a movable target element and an inductive sensor including an inductor. The target element has a range of positions during operation of the door operator, and the inductive sensor is associated with the target element. In this aspect, the method may include supplying an alternating current to the inductor, thereby causing the inductor to generate a magnetic field; inductively linking the inductor and the target element using the generated magnetic field, thereby generating eddy currents on the target element, wherein the eddy currents affect a variable characteristic of the inductive sensor via the inductive link; generating an output signal representative of the variable characteristic of the inductive sensor, wherein the variable characteristic varies in response to movement of the target element as a result of the eddy currents and the inductive link; selecting an action based at least in part upon the output signal; and performing the selected action.

Certain refinements of this aspect include one or more of the following: wherein the door operator comprises a rotatable arm, a pinion rotationally coupled with the arm, a rack drivingly engaged with the pinion, and a spring engaged with the rack, and wherein the target element is included in one of the arm, the pinion, the rack, and the spring; the door operator further comprises a body, wherein the pinion, the rack, the spring, and the inductive sensor are mounted in the body, and wherein the target element is included in one of the rack and the spring.

Additional refinements include one or more of the following: wherein the door operator comprises a body, a pinion rotatably mounted in the body, and an arm rotationally coupled with the pinion, wherein the inductive sensor is mounted to the body, and wherein the arm comprises the target element; further comprising applying a force to the arm via the pinion, wherein the action includes adjusting the force; wherein the door operator further comprises an actuating mechanism operable to adjust a rotational speed of the arm, and the selected action includes operating the actuating mechanism to adjust the rotational speed of the arm. In a further refinement, the method further comprises determining a rotational direction of the arm based upon the output signal, wherein the rotational direction is one of an opening direction and a closing direction, and wherein selecting the action is further based upon the rotational direction of the arm; wherein selecting the action includes selecting a backcheck action in response to a first output signal value and the opening direction, and selecting a latching action in response to a second output signal value and the closing direction; wherein when the selected action is the backcheck action, performing the selected action includes operating the actuating device to decrease the rotational speed of the arm; and wherein when the selected action is the latching action, performing the selected action includes operating the actuating device to increase the rotational speed of the arm.

In further refinements, the door operator is mounted to a door having a plurality of door positions, and selecting the action based at least in part upon the output signal includes: determining a current door position based upon the output signal; and selecting the action based at least in part upon the current door position. In certain forms, the arm has a plurality of arm positions, wherein each of the arm positions corresponds to one of the door positions, and wherein determining the current door position based upon the output signal includes: determining a current arm position based upon the output signal, and determining the current door position based upon the current arm position. In certain forms, the plurality of door positions includes a closed door position and an additional door position, wherein the arm has a plurality of arm positions including a closed arm position corresponding to the closed door position and an additional arm position corresponding to the additional door position, wherein the method further comprises mounting the inductive sensor to the door operator such that the variable characteristic has a door closed value in response to the closed arm position and an additional value in response to the additional arm position, and wherein determining the current door position based upon the output signal includes determining the door closed position in response to a first output signal value corresponding to the door closed value of the variable characteristic and determining the additional door position in response to a second output signal value corresponding to the additional value of the variable characteristic.

In certain refinements, the inductor comprises a plurality of coils, wherein the plurality of coils includes an overlapped subset of coils, wherein each of the coils in the overlapped subset is overlapped by the target element, wherein the output signal corresponds to the coils in the overlapped subset, and wherein movement of the target element changes the overlapped subset.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A door operator configured for use with a door having a plurality of door positions, the door operator comprising:
    an operator body including a pinion, wherein the pinion is rotatable about a rotational axis;
    an arm connected to the pinion and extending away from the rotational axis, wherein the arm has a plurality of arm positions, and each of the arm positions corresponds to one of the door positions;

an inductive sensor includes a plurality of coils and is mounted on the closer body and overlapped by the arm so that the inductive sensor is inductively linked with the arm via the plurality of coils and is configured to: generate a characteristic of the inductive sensor that varies in response to the rotation of the arm as a quantity of coils that the arm overlaps as each of the arm positions varies in response to rotation of the arm, wherein a magnitude of the characteristic increases as the quantity of coils that the arm overlaps increases and the magnitude of the characteristic decreases as the quantity of the coils that the arm overlaps decreases; and a controller configured to determine a current position based upon the magnitude of the characteristic of the inductive sensor that corresponds to the quantity of coils that the arm overlaps, wherein the current position includes at least one of (i) an arm position of the plurality of arm positions or (ii) a door position of the plurality of door positions.

2. The door operator of claim 1, wherein the characteristic includes at least one of an inductance or an impedance.

3. The door operator of claim 1, wherein the controller is further configured to select an action based upon the current position, and to issue at least one command related to the action.

4. The door operator of claim 2, further comprising an actuating mechanism in communication with the controller, wherein the actuating mechanism is configured to adjust a speed of the arm in response to the command.

5. The door operator of claim 1, wherein sensor includes an opening, at least one of the pinion and the arm extends through the opening, and the coils are curved about the opening.

6. The door operator of claim 1, wherein each of the coils has a first end and a second end, and wherein each of the coils subtends a unique central angle with respect to the rotational axis.

7. The door operator of claim 6, wherein the first ends are offset from one another by a first average separation, the second ends are offset from one another by a second average separation, and the second average separation is greater than the first average separation.

8. The door operator of claim 7, wherein the second average separation is an offset angle, and each of the second ends are offset from one another by the offset angle.

9. The door operator of claim 6, wherein the inductor comprises a plurality of end segments and a plurality of connector segments, wherein each of the connector segments connects two of the coils, and wherein each of the first ends is defined by one of the end segments and each of the second ends is defined by one of the connector segments.

10. The door operator of claim 1, further comprising a converter in communication with the controller and the inductive sensor, wherein the converter is structured to generate an output signal indicative of the characteristic, and the controller is structured to determine the current position based upon the output signal.

11. A door operator configured for use with a door having a plurality of door positions, the door operator comprising:
an operator body including a pinion, wherein the pinion is rotatable about a rotational axis;
an arm connected to the pinion and extending away from the rotational axis, wherein the arm has a plurality of arm positions, and each of the arm positions corresponds to one of the door positions;

an inductive sensor mounted on the closer body and overlapped by the arm, the inductive sensor including an inductor comprising plurality of coils, wherein the inductor is operable to be inductively linked with the arm, and wherein the arm overlaps a unique subset of the coils in each of the plurality of arm positions such that a characteristic of the inductive sensor varies in response to rotation of the arm when the arm is inductively linked with the inductor; and a controller in communication with the inductive sensor, wherein the controller is configured to determine a current position based upon the characteristic of the inductive sensor, wherein the current position includes at least one of (i) an arm position of the plurality of arm positions or (ii) a door position of the plurality of door positions;

wherein each of the coils has a first end and a second end, and wherein each of the coils subtends a unique central angle with respect to the rotational axis;

wherein the first ends are offset from one another by a first average separation, the second ends are offset from one another by a second average separation, and the second average separation is greater than the first average separation; and wherein a first subset of the second ends are positioned within a first angular range and are offset from one another by a third average separation, and a second subset of the second ends are positioned within a second angular range and are offset from one another by a fourth average separation less than the third average separation.

12. A door operator, comprising:
an operator body including a pinion, wherein the pinion is rotatable about a rotational axis;
an arm connected to the pinion, wherein the min is rotatable through a range of rotational positions and has a current rotational position within the range of rotational positions;
an inductive sensor mounted adjacent the arm, the inductive sensor including an inductor comprising a plurality of nested coils, wherein each of the coils is curved about the pinion and is configured to generate a characteristic of the inductive sensor that varies in response to the rotation of the arm as a quantity of nested coils that the arm overlaps as each of the arm positions varies in response to rotation of the arm, wherein a magnitude of the characteristic increases as the quantity of coils that the arm overlaps increases and the magnitude of the characteristic decreases as the quantity of the coils that the arm overlaps decreases; and
a controller in communication with the inductive sensor, wherein the controller is configured to provide the inductive sensor with a varying power signal, and the inductive sensor is configured to inductively link the inductor to the arm in response to the varying power signal;
and
wherein the controller is further configured to receive information relating to a magnitude of the characteristic that corresponds to the quantity of coils that the arm overlaps, and to determine the current rotational position of the arm based upon the received information.

13. The door operator of claim 12, wherein each of the coils comprises a first end and a second end, wherein the first and seconds ends of each of the plurality of coils define a central angle of the coil about the pinion, and wherein the central angle of each of the plurality of coils is different from the central angle of each of the other coils.

14. The door operator of claim 12, wherein each of the coils includes a first segment, a second segment, and an end segment connecting the first segment and the second segment, wherein the first segment and the second segment are curved about the rotational axis;
   wherein each of the coils is at least one of an outer coil and an inner coil, and wherein each of the inner coils is nested within a corresponding one of the outer coils;
   wherein the inductor further comprises a plurality of connector segments, and each of the connector segments connects the first segment of one of the outer coils to the second segment of the corresponding one of the inner coils.

15. The door operator of claim 12, wherein the inductive sensor further comprises a printed circuit board including a trace, and wherein the trace defines the plurality of coils.

16. The door operator of claim 12, further comprising an actuator in communication with the controller, wherein the controller is further configured to issue a command based upon the rotational position of the arm, and wherein the actuator is configured to adjust a rotational speed of the pinion in response to the command.

17. The door operator of claim 12, wherein the controller comprises:
   a sensor activating unit structured to provide the inductive sensor with the varying power signal, wherein the inductive sensor is configured to generate an output signal in response to receiving the varying power signal, the output signal including the information relating to the characteristic;
   a sensor receiving unit structured to receive the output signal;
   a position determining unit structured to determine the rotational position of the arm based upon the output signal;
   an action selecting unit structured to select an action based upon the rotational position of the arm; and
   a commands unit structured to issue a command related to the selected action.

18. The door operator of claim 12, wherein the varying power signal is an alternating current (AC) power signal.

19. A door operator configured for use with a door having a plurality of door positions including a closed door position and an additional door position, the door operator comprising:
   an operator body including a pinion, wherein the pinion is rotatable about a rotational axis;
   an arm coupled to the pinion and extending away from the rotational axis, the arm having a plurality of arm positions including a closed arm position corresponding to the closed door position and an additional arm position corresponding to the additional door position;
   an inductive sensor mounted to the operator body adjacent the pinion, the inductive sensor including a first inductor and a second inductor positioned to include a plurality of coils, and an alignment region, wherein the alignment region is aligned with the closed arm position;
   a mode selector operable to connect the inductive sensor to a power supply, the mode selector having a first state and a second state;
      wherein with the power supply connected to the mode selector in the first state, the first inductor is active, and the active first inductor is structured to inductively link the inductive sensor with the arm and to vary a variable characteristic of the inductive sensor in response to rotation of the arm as a quantity of coils that the arm overlaps in each of the arm positions varies in response to rotation of the arm, wherein a magnitude of the characteristic increases as the quantity of coils that the arm overlaps increases and the magnitude of the characteristic decreases as the quantity of the coils that the arm overlaps decreases; and
      wherein with the power supply connected to the mode selector in the second state, the second inductor is active, and the active second inductor is structured to inductively link the inductive sensor with the arm and to vary a variable characteristic of the inductive sensor in response to rotation of the arm;
   a converter in communication with the inductive sensor, wherein the converter is structured to generate an output signal corresponding to the magnitude of the variable characteristic that corresponds to the quantity of coils that the arm overlaps; and
   a controller in communication with the converter, wherein the controller is structured to determine a current door position based upon the output signal.

20. The door operator of claim 19, wherein the mode selector includes a first header connected to the first inductor and a second header connected to the second inductor.

21. The door operator of claim 19, wherein the inductive sensor further includes a header, and the mode selector includes a switch operable to selectively connect the header to the first inductor and the second inductor, wherein the switch is structured to connect the header with the first inductor when in the first mode and to connect the header with the second inductor when in the second mode.

22. The door operator of claim 19, wherein with the power supply connected to the mode selector in the first state, the second inductor includes an inactive portion that is not operable to receive power from the power supply.

23. A door operator configured for use with a door having a plurality of door positions including a closed door position and an additional door position, the door operator comprising:
   an operator body including a pinion, wherein the pinion is rotatable about a rotational axis;
   an arm coupled to the pinion and extending away from the rotational axis, the arm having a plurality of arm positions including a closed arm position corresponding to the closed door position and an additional arm position corresponding to the additional door position;
   an inductive sensor mounted to the operator body adjacent the pinion, the inductive sensor including a first inductor, a second inductor, and an alignment region, wherein the alignment region is aligned with the closed arm position;
   a mode selector operable to connect the inductive sensor to a power supply, the mode selector having a first state and a second state;
      wherein with the power supply connected to the mode selector in the first state, the first inductor is active, and the active first inductor is structured to inductively link the inductive sensor with the arm and to vary a variable characteristic of the inductive sensor in response to rotation of the arm; and
      wherein with the power supply connected to the mode selector in the second state, the second inductor is active, and the active second inductor is structured to inductively link the inductive sensor with the arm and to vary a variable characteristic of the inductive sensor in response to rotation of the arm;

a converter in communication with the inductive sensor, wherein the converter is structured to generate an output signal corresponding to the variable characteristic; and a controller in communication with the converter, wherein the controller is structured to determine a current door position based upon the output signal; and wherein the door operator has a first configuration and a second configuration;

wherein with the door operator in the first configuration, the arm is coupled to the pinion in a first orientation, the closed arm position is a first closed arm position and the additional arm position is a first additional arm position, the alignment region is aligned with the first arm closed position, the mode selector is in the first state, and the first inductor is structured to provide the inductive sensor with a first variable characteristic value in response to the first closed arm position and a second variable characteristic value in response to the first additional arm position;

wherein with the door operator in the second configuration, the arm is coupled to the pinion in a second orientation, the closed arm position is a second closed arm position and the additional arm position is a second additional arm position, the alignment region is aligned with the second arm closed position, the mode selector is in the second state, and the second inductor is structured to provide the inductive sensor with the first variable characteristic value in response to the second closed arm position and the second variable characteristic value in response to the second additional arm position; and wherein the controller is structured to determine the closed door position in response to a first output signal value corresponding to the first variable characteristic value and to determine the additional door position in response to a second output signal value corresponding to the second variable characteristic value.

24. The door operator of claim 23, wherein the second inductor includes the first inductor.

* * * * *